US009959591B2

(12) United States Patent
Sendai et al.

(10) Patent No.: US 9,959,591 B2
(45) Date of Patent: May 1, 2018

(54) DISPLAY APPARATUS, METHOD FOR CONTROLLING DISPLAY APPARATUS, AND PROGRAM

(71) Applicant: SEIKO EPSON CORPORATION, Tokyo (JP)

(72) Inventors: Kaori Sendai, Okaya (JP); Atsunari Tsuda, Suwa (JP); Masahide Takano, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days. days.

(21) Appl. No.: 14/719,985

(22) Filed: May 22, 2015

(65) Prior Publication Data
US 2016/0035136 A1 Feb. 4, 2016

(30) Foreign Application Priority Data

Jul. 31, 2014 (JP) .................................. 2014-156697
Mar. 2, 2015 (JP) .................................. 2015-039766

(51) Int. Cl.
| | |
|---|---|
| G06T 1/60 | (2006.01) |
| G02B 27/01 | (2006.01) |
| G06T 11/00 | (2006.01) |
| G06F 3/01 | (2006.01) |
| H04N 13/04 | (2006.01) |

(52) U.S. Cl.
CPC ............ *G06T 1/60* (2013.01); *G02B 27/0172* (2013.01); *G06F 3/011* (2013.01); *G06F 3/012* (2013.01); *G06F 3/017* (2013.01); *G06T 11/00* (2013.01); *H04N 13/044* (2013.01); *G02B 2027/0178* (2013.01); *G06F 2200/1636* (2013.01); *G06F 2203/04806* (2013.01)

(58) Field of Classification Search
CPC ........... G06T 1/60; G06T 11/00; H04N 5/232; H04N 13/044; G02B 27/0172; G02B 2027/0178; G06F 2200/1636; G06F 2203/04806; G06F 3/011; G06F 3/012; G06F 3/017
USPC ........................................................ 345/633
See application file for complete search history.

(56) References Cited

U.S. PATENT DOCUMENTS

| 8,194,101 B1* | 6/2012 | Mann ....................... G09G 5/00 |
|---|---|---|
| | | 345/633 |
| 2005/0093886 A1* | 5/2005 | Kubota ................ H04N 1/3872 |
| | | 345/619 |

(Continued)

FOREIGN PATENT DOCUMENTS

| JP | 2014-056217 A | 3/2014 |
|---|---|---|
| WO | 2014/110437 A1 | 7/2014 |

*Primary Examiner* — Ke Xiao
*Assistant Examiner* — Kim-Thanh T Tran
(74) *Attorney, Agent, or Firm* — Oliff PLC

(57) ABSTRACT

A head mounted display is worn on the body of a user before use and includes an image display unit that transmits an outside scene and displays an image in a visually recognizable manner along with the outside scene and a camera that performs image capturing in directions of sight lines of the user. A control section of the head mounted display includes an image generation section that generates a display image from a captured image from the camera and an image display control section that causes the image display unit to display the display image generated by the image generation section.

24 Claims, 12 Drawing Sheets

(56) References Cited

U.S. PATENT DOCUMENTS

| | | | |
|---|---|---|---|
| 2006/0244820 A1* | 11/2006 | Morita | G06T 19/006 348/14.13 |
| 2012/0038671 A1* | 2/2012 | Min | G06T 19/00 345/633 |
| 2012/0194550 A1* | 8/2012 | Osterhout | G02B 27/0093 345/633 |
| 2012/0212508 A1* | 8/2012 | Kimball | G02B 27/0093 345/633 |
| 2014/0198129 A1 | 7/2014 | Liu et al. | |
| 2014/0275760 A1* | 9/2014 | Lee | A61B 1/00045 600/102 |
| 2014/0285404 A1* | 9/2014 | Takano | G06F 3/005 345/8 |
| 2015/0227222 A1* | 8/2015 | Sako | G06F 3/011 345/173 |
| 2015/0363979 A1* | 12/2015 | Takano | A61B 6/461 345/633 |

* cited by examiner

DISPLAY APPARATUS, METHOD FOR CONTROLLING DISPLAY APPARATUS, AND PROGRAM

BACKGROUND

1. Technical Field

The present invention relates to a display apparatus, a method for controlling the display apparatus, and a program.

2. Related Art

There is a known wearable display apparatus that displays an image superimposed on an outside scene (see JP-A-2014-56217, for example). The apparatus described in JP-A-2014-56217 has a configuration in which an outside scene and characters are superimposed on each other when displayed and displays part of the characters or words with the font size, the color, or any other attribute thereof so changed that characters in part of a sentence, for example, are readily identifiable.

JP-A-2014-56217 describes a display method in a case where a user who uses the wearable display apparatus views characters displayed by the display apparatus or an outside scene. There has been, however, no proposal on a display method that takes into account a case where the user views characters along with an outside scene.

SUMMARY

An advantage of some aspects of the invention is to provide a display apparatus, a method for controlling the display apparatus, and a program that allow an outside scene visible to a user to be effectively combined with a displayed content.

A display apparatus according to an aspect of the invention is a display apparatus worn on a body of a user before use, the apparatus including a display section that transmits an outside scene and displays an image in a visually recognizable manner along with the outside scene, an imaging section that performs image capturing along directions of sight lines of the user, an image generation section that generates a display image from a captured image from the imaging section, and an image display control section that causes the display section to display the display image generated by the image generation section.

According to the aspect of the invention, a display image based on a captured image captured along the directions of the sight lines of the user can be so displayed that the display image is superimposed on a target object visible as the outside scene. A novel method for using an image displayed by the display apparatus can therefore be provided in the form of an effective combination of an outside scene outside the display apparatus and a displayed content, for example, by enhancing the way the user views the outside scene based on a captured image generated by capturing the outside scene or presenting another way of viewing the outside scene.

The display apparatus according to the aspect of the invention described above may further include a detection section that detects a state in which the display apparatus is used, and the image display control section may adjust a form in accordance with which the display section displays the display image in correspondence with the state in which the display apparatus is used and which is detected by the detection section.

According to the aspect of the invention, the display size, the display position, and other aspects of an image displayed in the display section can be adjusted in correspondence with the environment in which the display apparatus is used and the way in which the user uses the display apparatus, whereby the display operation can be performed in accordance with the way in which the user visually recognizes an outside scene.

In the display apparatus according to the aspect of the invention described above, the detection section may detect the position of the display apparatus, and the image display control section may adjust the form in accordance with which the display image is displayed in correspondence with the position of the display apparatus detected by the detection section.

According to the aspect of the invention, the display operation can be performed based on the position of the display apparatus in accordance with the way in which the user visually recognizes an outside scene.

In the display apparatus according to the aspect of the invention described above, the image display control section may adjust at least one of a display position and a display size of the display image in such a way that the display image is separate from the center of the directions of sight lines of the user in correspondence with the position of the display apparatus detected by the detection section.

According to the aspect of the invention, an image captured with the imaging section can be so displayed that the image does not bother the user who views an outside scene.

The display apparatus according to the aspect of the invention described above may further include an action detection section that detects action of the user based on a captured image from the imaging section, and the image display control section may adjust the form in accordance with which the display image is displayed in correspondence with the action of the user detected by the action detection section.

According to the aspect of the invention, by allowing the user to perform action an image of which can be captured with the imaging section, the form in accordance with which the display image is displayed can be adjusted.

The display apparatus according to the aspect of the invention described above may further include a voice detection section that detects voice, and the image display control section may adjust the form in accordance with which the display image is displayed in correspondence with a result of the voice detection from the voice detection section.

According to the aspect of the invention, by allowing the user to speak, the form in accordance with which the display image is displayed can be adjusted.

In the display apparatus according to the aspect of the invention described above, the image generation section may generate the display image by extracting and processing part of a captured image from the imaging section.

According to the aspect of the invention, since a captured image captured along the directions of the sight lines of the user is used to perform the display operation, the user is allowed to view an outside scene and an image generated by processing part of the outside scene.

The display apparatus according to the aspect of the invention described above may further include an action detection section that detects action of the user based on a captured image from the imaging section, and the image generation section may generate the display image by extracting, from the captured image from the imaging section, an area identified based on the action of the user detected by the action detection section and processing the extracted area.

According to the aspect of the invention, by allowing the user to perform action an image of which can be captured with the imaging section, the area extracted from the captured image can be determined.

In the display apparatus according to the aspect of the invention described above, the image generation section may generate the display image by cutting out and enlarging part of a captured image from the imaging section.

According to the aspect of the invention, since part of a captured image captured along the directions of the sight lines of the user is cut out and enlarged before displayed, the user can view an outside scene and a portion thereof along the directions of the sight lines as an enlarged image.

In the display apparatus according to the aspect of the invention described above, the image generation section may generate the display image by cutting out an area that satisfies a preset condition in a captured image from the imaging section.

According to the aspect of the invention, a captured image that satisfies the preset condition can be displayed. For example, when a captured image that satisfies a preference or an interest of the user is captured, the display section can display the captured image and show it to the user.

The display apparatus according to the aspect of the invention described above may further include a target detection section that identifies directions corresponding to the directions of the sight lines of the user and detects a target object present in the directions of the sight lines of the user from a captured image from the imaging section, and the image generation section may generate the display image by extracting, from the captured image from the imaging section, an area containing an image of the target object detected by the target detection section and processing the extracted area.

According to the aspect of the invention, when a target object is present in the directions of the sight lines of the user, an image of the target object can be presented to the user.

In the display apparatus according to the aspect of the invention described above, the target detection section may detect the directions of the sight lines of the user and detects the target object present in the detected directions of the sight lines of the user.

According to the aspect of the invention, a portion corresponding to the directions of the sight lines of the user in a captured image can be displayed as the display image.

In the display apparatus according to the aspect of the invention described above, the target detection section may detect the direction of the sight line of an eye corresponding to a dominant eye of both eyes of the user.

According to the aspect of the invention, a portion corresponding to the direction of the sight line of the dominant eye of the user in a captured image can be displayed as the display image.

In the display apparatus according to the aspect of the invention described above, when the action detection section detects predetermined action of the user, the target detection section identifies the directions corresponding to the directions of the sight lines of the user based on the predetermined action.

According to the aspect of the invention, a portion to be extracted as the display image from a captured image can be specified by the action of the user.

In the display apparatus according to the aspect of the invention described above, when the action detection section detects action of at least one of limbs of the user, the target detection section may identify the directions corresponding to the directions of the sight lines of the user based on the detected action.

According to the aspect of the invention, by allowing the user to move any of the limbs, a portion to be extracted as the display image from a captured image can be specified.

The display apparatus according to the aspect of the invention described above may further include a storage section that stores the amount of feature of an image of the target object, and the target detection section may detect the target object by detecting an image that conforms to the amount of feature stored in the storage section from a captured image from the imaging section.

According to the aspect of the invention, a target object can be readily detected based on a captured image.

In the display apparatus according to the aspect of the invention described above, the amount of feature stored in the storage section may contain one of the amount of feature of an image of a specific target object and the amount of feature for general purposes that corresponds to a plurality of types of target objects similar to each other.

According to the aspect of the invention, the process of detecting a specific target object or the process of detecting any of a plurality of target objects similar to each other can be carried out based on the stored amount of feature.

The display apparatus according to the aspect of the invention described above may further include a distance detection section that detects a distance between the target object detected by the target detection section and the user, and the image display control section may generate the display image by enlarging part of a captured image from the imaging section in accordance with an enlargement factor according to the distance detected by the distance detection section.

According to the aspect of the invention, an image of the target object can be enlarged in accordance with the enlargement factor corresponding to the distance to the target object present in the directions of the sight lines of the user, and the enlarged image can be presented to the user.

In the display apparatus according to the aspect of the invention described above, the image generation section may generate the display image by acquiring a plurality of captured images captured by the imaging section at different points of time and specifying an area that satisfies a preset condition in the plurality of captured images.

According to the aspect of the invention, a complicated condition can be set on the plurality of captured images, and images based on captured images that satisfy the condition can be presented to the user.

In the display apparatus according to the aspect of the invention described above, the image generation section may generate the display image by acquiring a plurality of captured images captured by the imaging section at different points of time and cutting out part of the acquired captured images when differences between the plurality of captured images satisfy a preset condition.

According to the aspect of the invention, since the display image can be generated and displayed based on the differences between the plurality of captured images, motion images formed of a plurality of continuous images can, for example, be used to generate display images based on changes in the images and display the display images.

Another aspect of the invention is directed to a method for controlling a display apparatus worn on a body of a user before use and including a display section that transmits an outside scene and displays an image in a visually recognizable manner along with the outside scene, the method including performing image capturing along directions of sight lines of the user, cutting and enlarging part of a captured image to generate a display image, and causing the display section to display the generated display image.

According to the aspect of the invention, a display image based on a captured image captured along the directions of the sight lines of the user can be so displayed that the display image is superimposed on a target object visible as the outside scene. A novel method for using an image displayed by the display apparatus can therefore be provided in the form of an effective combination of an outside scene outside the display apparatus and a displayed content, for example, by enhancing the way the user views the outside scene based on a captured image generated by capturing the outside scene or presenting another way of viewing the outside scene.

Still another aspect of the invention is directed to a program executable by a computer that controls a display apparatus worn on a body of a user before use and including a display section that transmits an outside scene and displays an image in a visually recognizable manner along with the outside scene, the program causing the computer to function as an image generation section that cuts and enlarges part of a captured image generated by performing image capturing along directions of sight lines of the user to generate a display image and an image display control section that causes the display section to display the image generated by the image generation section.

According to the aspect of the invention, a display image based on a captured image captured along the directions of the sight lines of the user can be so displayed that the display image is superimposed on a target object visible as the outside scene. A novel method for using an image displayed by the display apparatus can therefore be provided in the form of an effective combination of an outside scene outside the display apparatus and a displayed content, for example, by enhancing the way the user views the outside scene based on a captured image generated by capturing the outside scene or presenting another way of viewing the outside scene.

BRIEF DESCRIPTION OF THE DRAWINGS

The invention will be described with reference to the accompanying drawings, wherein like numbers reference like elements.

FIG. 5A shows an example of the field of view of a user. FIGS. 5B and 5C shows examples of an image cut out from a captured image. FIG. 5D shows an example of the field of view of the user in a case where a display image is displayed.

FIG. 7A shows an example of the environment in which the head mounted display is used, and FIGS. 7B and 7C show display examples.

FIG. 9A is a perspective view of the key portions of the image display unit viewed from the side where user's head is present, and FIG. 9B describes the directions of sight lines.

DESCRIPTION OF EXEMPLARY EMBODIMENTS

First Embodiment

An embodiment to which the invention is applied will be described below.

Figure 1:
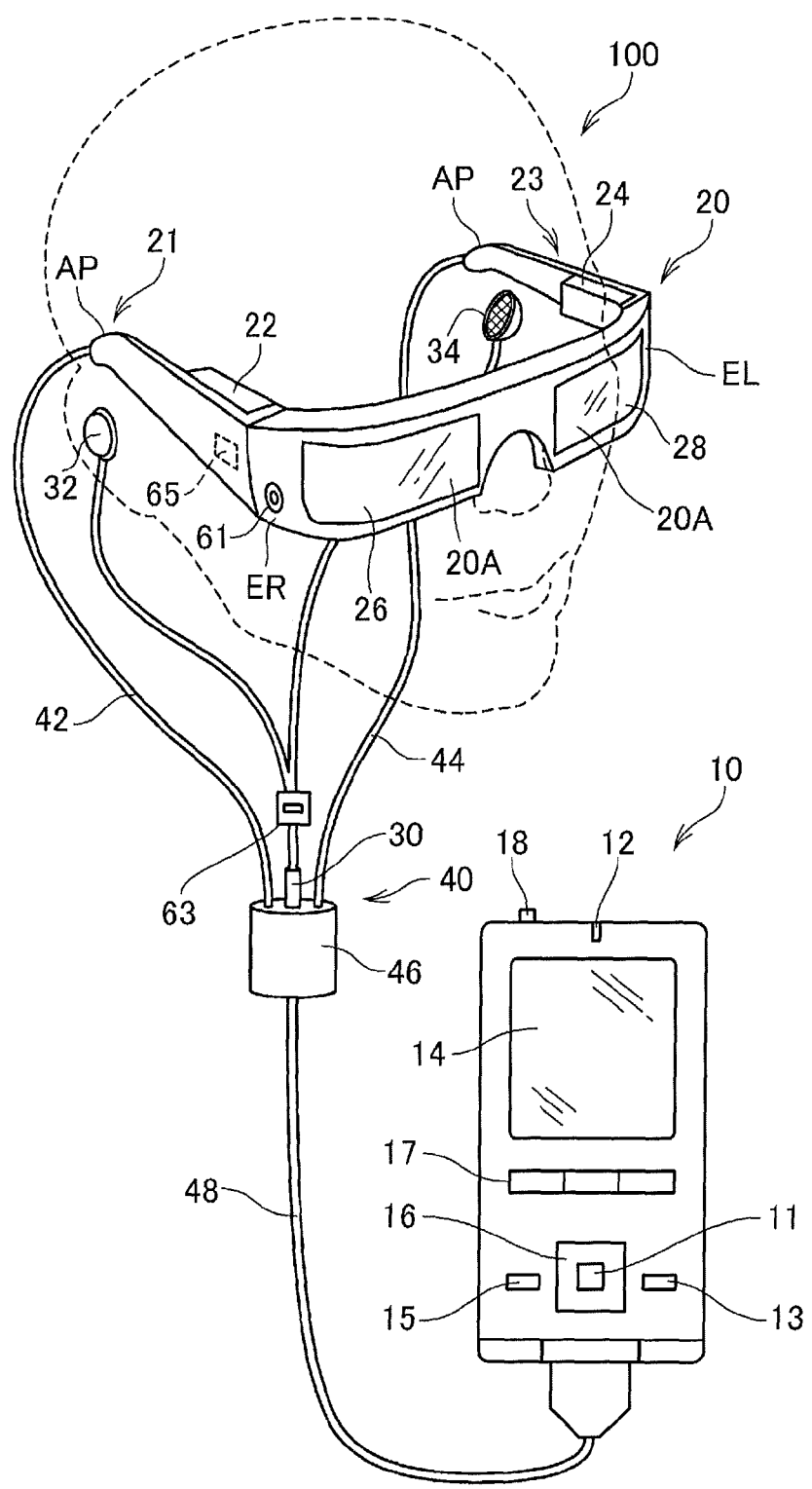
FIG. 1 is a descriptive diagram showing an exterior configuration of a head mounted display according to a first embodiment.

FIG. 1 is a descriptive diagram showing an exterior configuration of a head mounted display 100 according to a first embodiment. The head mounted display 100 is a display apparatus worn around a head and is also called an HMD. The head mounted display 100 according to the present embodiment is an optically transmissive head mounted display that allows a user to not only visually recognize a virtual image but also directly visually recognize an outside scene at the same time. In the present specification, a virtual image that the head mounted display 100 allows the user to recognize is called a "display image" for convenience. Further, outputting image light generated based on image data is also referred to as "displaying an image."

The head mounted display 100 includes an image display unit 20, which is worn around user's head and allows the user to recognize a virtual image, and a control unit 10, which controls the image display unit 20. The control unit 10 also functions as a controller that allows the user to operate the head mounted display 100. The image display unit 20 is also simply called a "display section."

The image display unit 20 is a wearable member worn around user's head and has a spectacle-like shape in the present embodiment. The image display unit 20 includes a right holder 21, a right display driver 22, a left holder 23, a left display driver 24, a right optical image display section 26, a left optical image display section 28, a camera 61 (imaging section), and a microphone 63. The right optical image display section 26 and the left optical image display section 28 are so disposed that they are located in front of the right and left eyes of the user who wears the image display unit 20. One end of the right optical image display section 26 and one end of the left optical image display section 28 are connected to each other in a position corresponding to the portion between the eyes of the user who wears the image display unit 20.

The right holder 21 is a member extending from an end ER of the right optical image display section 26, which is the other end thereof, to a position corresponding to a right temporal region of the user who wears the image display unit 20. Similarly, the left holder 23 is a member extending from an end EL of the left optical image display section 28, which is the other end thereof, to a position corresponding to a left temporal region of the user who wears the image display unit 20. The right holder 21 and the left holder 23, which serve as temples (bows) of spectacles, hold the image display unit 20 around user's head.

The right display driver 22 and the left display driver 24 are disposed on opposite sides of the head of the user who wears the image display unit 20. In the following description, the right holder 21 and the left holder 23 are also simply called "holders" in a collective manner. The right display driver 22 and the left display driver 24 are also simply called "display drivers" in a collective manner. The right optical image display section 26 and the left optical image display section 28 are also simply called "optical image display sections" in a collective manner.

The display drivers 22 and 24 include liquid crystal displays 241 and 242 (hereinafter also referred to as "LCDs 241 and 242"), projection systems 251 and 252, and other components (see FIG. 2). The configuration of the display drivers 22 and 24 will be described later in detail. The optical image display sections 26 and 28, each of which serves as an optical member, include light guide plates 261 and 262 (see FIG. 2) and light control plates 20A. The light guide plates 261 and 262 are made, for example, of a light transmissive resin and guide image light outputted from the display drivers 22 and 24 to user's eyes. The light control plates 20A are each a thin-plate-shaped optical element and are so disposed that they cover the front side of the image display unit 20 that faces away from the side where user's eyes are present. Each of the light control plates 20A can be a plate having light transmittance of substantially zero, a nearly transparent plate, a plate that transmits light but attenuates the amount of light, a plate that attenuates or reflects light of a specific wavelength, or any of other variety of optical component. Appropriate selection of optical characteristics (such as light transmittance) of the light control plates 20A allows adjustment of the amount of external light externally incident on the right optical image display section 26 and the left optical image display section 28 and hence adjustment of visibility of a virtual image. In the present embodiment, a description will be made of a case where the light control plates 20A are optically transmissive enough to allow the user who wears the head mounted display 100 to visually recognize an outside scene. The light control plates 20A also protect the right light guide plate 261 and the left light guide plate 262 and prevent the right light guide plate 261 and the left light guide plate 262 from being damaged, dirt from adhering thereto, and other defects from occurring.

The light control plates 20A may be configured to be attachable to and detachable from the right optical image display section 26 and the left optical image display section 28, or a plurality of types of light control plates 20A may be exchangeably attachable. The light control plates 20A may even be omitted.

The camera 61 is disposed at the end ER, which is the other end of the right optical image display section 26. The camera 61 captures an image of an outside scene that is a scene of the outside, which is on the side opposite user's eyes, to acquire an outside scene image. The camera 61 in the present embodiment shown in FIG. 1 is a monocular camera and may alternatively be a stereoscopic camera.

The image capturing direction of the camera 61, that is, the angle of view thereof is defined on the front side of the head mounted display 100, in other words, the direction in which the camera 61 captures an image of at least part of an outside scene in the direction of the field of view of the user who wears the head mounted display 100. Further, the range of the angle of view of the camera 61 can be set as appropriate, and it is preferable that the image capturing range of the camera 61 covers the outside (outside scene) visually recognized by the user through the right optical image display section 26 and the left optical image display section 28. Further, it is more preferable that the image capturing range of the camera 61 is so set that the camera 61 can capture an image of the entire field of view of the user through the light control plates 20A.

The image display unit 20 further includes a connection section 40 for connecting the image display unit 20 to the control unit 10. The connection section 40 includes a body cord 48, which is connected to the control unit 10, a right cord 42, a left cord 44, and a connection member 46. The right cord 42 and the left cord 44 are two cords into which the body cord 48 bifurcates. The right cord 42 is inserted into an enclosure of the right holder 21 through a lengthwise end portion AP of the right holder 21 and connected to the right display driver 22. Similarly, the left cord 44 is inserted into an enclosure of the left holder 23 through a lengthwise end portion AP of the left holder 23 and connected to the left display driver 24.

The connection member 46 is disposed at the point where the body cord 48 bifurcates into the right cord 42 and the left cord 44 and has a jack for connecting an earphone plug 30. A right earphone 32 and a left earphone 34 extend from the earphone plug 30. The microphone 63 is provided in a position in the vicinity of the earphone plug 30. An integrated single code extends from the earphone plug 30 to the microphone 63 and bifurcates at the microphone 63 into two codes connected to the right earphone 32 and the left earphone 34, respectively.

Concrete specifications of the microphone 63 may be arbitrarily determined. The microphone 63 may be a directional microphone or an omni-directional microphone. Examples of the directional microphone may include a unidirectional (cardioid) microphone, a narrow directivity (super cardioid) microphone, a sharp directivity (hypercardioid) microphone, and an ultra-directivity (ultra cardioid) microphone. The microphone 63, when it has directivity, may be so configured that it collects and detects voice coming along the directions of the sight lines of the user who wears the head mounted display 100 in a particularly sensitive manner. In this case, to ensure the directivity of the microphone 63, the microphone 63 or a part that accommodates the microphone 63 may have a structural feature. For example, in the example shown in FIG. 1, the microphone 63 and the connection member 46 may be so designed that a sound collection portion of the microphone 63 faces the directions of the sight lines of the user who wears the right earphone 32 and the left earphone 34. The microphone 63 may instead be embedded in the right holder 21 or the left holder 23. In this case, opening a sound-collecting hole in a front-side surface of the right holder 21 or the left holder 23, that is, a surface aligned with the right optical image display section 26 or the left optical image display section 28 allows directivity corresponding to the directions of user's sight lines to be ensured. The directions of user's sight lines are, in other words, for example, the directions that the right optical image display section 26 and the left optical image display section 28 face, the direction along which the user faces the center of the field of view that the user views through the right optical image display section 26 and the left optical image display section 28, and the image capturing direction of the camera 61. Further, the direction of the directivity of the microphone 63 may be configured to be variable. In this case, the directions of user's sight line may be detected, and the direction of the directivity of the microphone 63 may be adjusted so as to coincide with the directions of the sight lines.

The right cord 42 and the left cord 44 can instead be integrated with each other into a single cord. Specifically, the wire in the right cord 42 may be caused to pass through the internal space in the body of the image display unit 20, brought into the left holder 23, and joined with the wire in the left cord 44, and the two wires are coated with a resin to form a single cord.

The image display unit 20 and the control unit 10 transmit a variety of signals to each other via the connection section 40. Connectors (not shown) that engage with each other are provided at the end of the body cord 48 that is opposite the end where the connection member 46 is present and at an end of the control unit 10. Causing the connectors at the body cord 48 and the control unit 10 to engage with each other and disengage from each other allows the control unit 10 and the image display unit 20 to be connected to each other and disconnected from each other. Each of the right cord 42, the left cord 44, and the body cord 48 can, for example, be a metal cable or an optical fiber.

The control unit 10 is an apparatus for controlling the head mounted display 100. The control unit 10 has a group of switches including a finalizing key 11, a lighting portion 12, a display switch key 13, a luminance switch key 15, a direction key 16, a menu key 17, and a power switch 18. The control unit 10 further includes a track pad 14, on which the user performs touch operation with a finger.

The finalizing key 11 detects user's pressing operation and outputs a signal that finalizes action corresponding to the operation performed on the control unit 10. The lighting portion 12 notifies the user of the state of action of the head mounted display 100 in the form of the lighting state. An example of the state of action of the head mounted display 100 is whether it is powered on or off. The lighting portion 12 is formed, for example, of an LED (light emitting diode). The display switch key 13 detects user's pressing operation and outputs a signal that switches, for example, content motion image display mode between a 3D mode and a 2D mode.

The track pad 14 detects operation performed by user's finger on an operation surface of the track pad 14 and outputs a signal according to a result of the detection. Examples of the track pad 14 may include a variety of types of track pad, such as an electrostatic type, a pressure detection type, and an optical type. The luminance switch key 15 detects user's pressing operation and outputs a signal that increases or decreases the luminance of an image displayed by the image display unit 20. The direction key 16 detects user's pressing operation performed on a portion corresponding to any of the upward, downward, rightward, and leftward directions and outputs a signal according to a result of the detection. The power switch 18 detects user's operation of sliding the switch and powers on or off the head mounted display 100.

Figure 2:
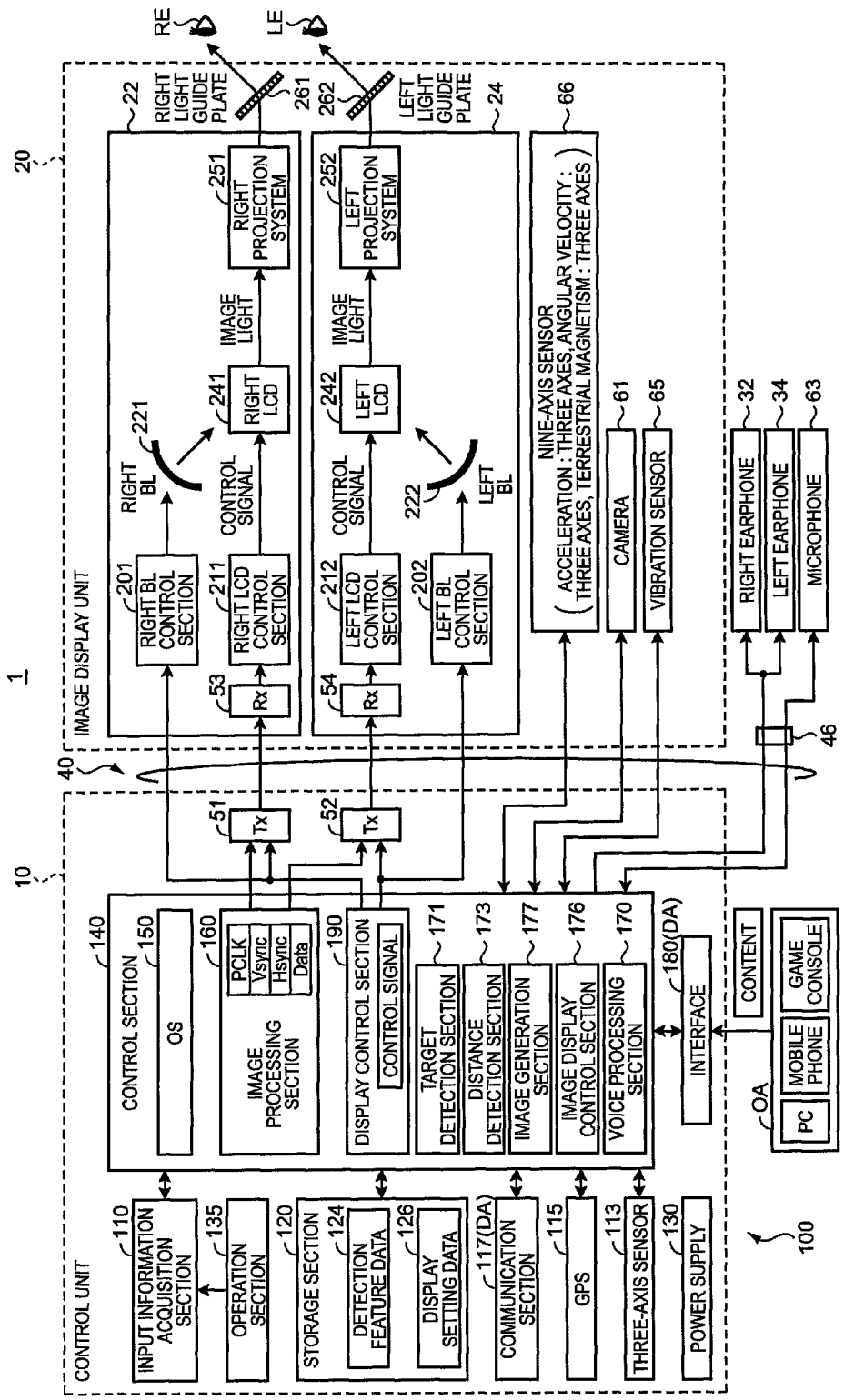
FIG. 2 is a block diagram showing a functional configuration of the head mounted display.

FIG. 2 is a functional block diagram of portions that form a display system 1 according to the embodiment.

The display system 1 includes an external apparatus OA and the head mounted display 100, as shown in FIG. 2. The external apparatus OA is, for example, a personal computer (PC), a mobile phone terminal, and a game console. The external apparatus OA is used as an image supply apparatus that supplies the head mounted display 100 with images.

The control unit 10 of the head mounted display 100 includes a control section 140, an operation section 135, an input information acquisition section 110, a storage section 120, a power supply 130, an interface 180, a transmitter (Tx) 51, and a transmitter (Tx) 52.

The operation section 135 detects user's operation. The operation section 135 includes the keys and switches shown in FIG. 1, finalizing key 11, the display switch key 13, the track pad 14, the luminance switch key 15, the direction key 16, the menu key 17, and the power switch 18.

The input information acquisition section 110 acquires a signal according to a user's operation input. Examples of the signal according to the operation input include inputs corresponding to operation performed on the track pad 14, the direction key 16, and the power switch 18.

The power supply 130 supplies the portions that form the head mounted display 100 with electric power. The power supply 130 can, for example, be a secondary battery.

The storage section 120 stores a variety of computer programs. The storage section 120 is formed, for example, of a ROM and a RAM. The storage section 120 may store image data to be displayed in the image display unit 20 of the head mounted display 100.

The storage section 120 stores detection feature data 124, which a target detection section 171, which will be described later, refers to, and display setting data 126, which is processed by an image display control section 176, which will be described later.

The interface 180 connects the variety of external apparatus OA, which are content supply sources, to the control unit 10. The interface 180 can be an interface that supports wired connection, such as a USB interface, a micro-USB interface, and a memory card interface.

The control section 140, which reads and executes the computer programs stored in the storage section 120, achieves a function of each portion. That is, the control section 140 functions as an operating system (OS) 150, an image processing section 160, a voice processing section 170, a target detection section 171, a distance detection section 173, an image display control section 176, an image generation section 177, and a display control section 190.

A three-axis sensor 113, a GPS 115, and a communication section 117 are connected to the control section 140. The three-axis sensor 113 is a three-axis acceleration sensor, and the control section 140 can acquire values detected with the three-axis sensor 113. The GPS 115 includes an antenna (not shown), receives GPS (global positioning system) signals, and determines the current position of the control unit 10. The GPS 115 outputs the current position and current time determined based on the GPS signals to the control section 140. The GPS 115 may further have a function of acquiring the current time based on information contained in the GPS signals and correcting the time clocked by the control section 140 in the control unit 10.

The communication section 117 performs wireless data communication that complies with wireless LAN (WiFi (registered trademark)), Miracast (registered trademark), Bluetooth (registered trademark), or any other standard.

When the external apparatus OA is wirelessly connected to the communication section 117, the control section 140 acquires content data via the communication section 117 and controls and causes the image display unit 20 to display an image. On the other hand, when the external apparatus OA is wired to the interface 180, the control section 140 acquires content data through the interface 180 and control and causes the image display unit 20 to display an image. The communication section 117 and the interface 180 are therefore hereinafter collectively referred to as data acquisition sections DA.

The data acquisition sections DA acquire content data to be displayed by the head mounted display 100 from the external apparatus OA. The content data contains image data that will be described later.

The image processing section 160 acquires an image signal contained in the content. The image processing section 160 separates a vertical sync signal VSync, a horizontal sync signal HSync, and other sync signals from the acquired image signal. Further, the image processing section 160 produces a clock signal PCLK, for example, by using a PLL (phase locked loop) circuit (not shown) in accordance with the cycles of the separated vertical sync signal VSync and horizontal sync signal HSync. The image processing section 160 converts the analog image signal from which the sync signals are separated into a digital image signal, for example, by using an A/D conversion circuit (not shown). The image processing section 160 then stores the converted digital image signal as image data on an image to be displayed (Data in FIG. 2) in a DRAM in the storage section 120 on a frame basis. The image data is, for example, RGB data.

The image processing section 160 may perform as required resolution conversion, luminance adjustment, chroma adjustment, and a variety of other types of color tone correction, keystone correction, and other types of image processing on the image data.

The image processing section 160 transmits the produced clock signal PCLK, the vertical sync signal VSync, the horizontal sync signal HSync, and the image data Data stored in the DRAM in the storage section 120 via the transmitters 51 and 52. The image data Data transmitted via the transmitter 51 is also called "image data for the right eye," and the image data Data transmitted via the transmitter 52 is also called "image data for the left eye." Each of the transmitters 51 and 52 functions as a transceiver for serial transmission between the control unit 10 and the image display unit 20.

The display control section 190 produces control signals that control the right display driver 22 and the left display driver 24. Specifically, the display control section 190 separately controls, with the aid of the control signals, for example, whether or not a right LCD control section 211 is instructed to drive the right LCD 241, whether or not a right backlight control section 201 is instructed to drive a right backlight 221, whether or not a left LCD control section 212 is instructed to drive the left LCD 242, and whether or not a left backlight control section 202 is instructed to drive a left backlight 222. The display control section 190 thus controls and causes each of the right display driver 22 and the left display driver 24 to generate and output image light. For example, the display control section 190 causes both the right display driver 22 and the left display driver 24 to generate image light, only one of them to generate image light, or neither of them to generate image light.

The display control section 190 transmits the control signals to the right LCD control section 211 and the left LCD control section 212 via the transmitters 51 and 52. The display control section 190 further transmits the control signals to the right backlight control section 201 and the left backlight control section 202.

The image display unit 20 includes the right display driver 22, the left display driver 24, the right light guide plate 261 as the right optical image display section 26, the left light guide plate 262 as the left optical image display section 28, the camera 61, a vibration sensor 65, and a nine-axis sensor 66.

The vibration sensor 65 is formed of an acceleration sensor and disposed in the image display unit 20, as shown in FIG. 1. In the example shown in FIG. 1, the vibration sensor 65 is built in a portion in the right holder 21 and in the vicinity of the end ER of the right optical image display section 26. The vibration sensor 65 detects vibration produced when the user knocks the end ER (performs knock operation) and outputs a result of the detection to the control section 140. Based on a result of the detection performed by the vibration sensor 65, the control section 140 detects the knock operation performed by the user.

The nine-axis sensor 66 is a motion sensor that detects acceleration (three axes), angular velocity (three axes), and terrestrial magnetism (three axes). The nine-axis sensor 66, which is provided in the image display unit 20, detects motion of the head of the user who wears the image display unit 20 around the head. Since the orientation of the image display unit 20 is identified based on the detected motion of user's head, the control section 140 can estimate the directions of user's sight lines.

The right display driver 22 includes a receiver (Rx) 53, the right backlight (BL) controlling section 201 and the right backlight (BL) 221, which function as a light source, the right LCD control section 211 and the right LCD 241, which function as a display device, and the right projection system 251. The right backlight control section 201 and the right backlight 221 function as a light source. The right LCD control section 211 and the right LCD 241 function as a display device. The right backlight control section 201, the right LCD control section 211, the right backlight 221, and the right LCD 241 are also collectively referred to as an "image light generation unit."

The receiver 53 functions as a receiver for serial transmission between the control unit 10 and the image display unit 20. The right backlight control section 201 drives the right backlight 221 based on the inputted control signal. The right backlight 221 is, for example, an LED, an electroluminescence (EL) device, or any other light emitter. The right LCD control section 211 drives the right LCD 241 based on the clock signal PCLK, the vertical sync signal VSync, the horizontal sync signal HSync, and the image data for the right eye Data1, which are inputted via the receiver 53. The right LCD 241 is a transmissive liquid crystal panel having a plurality of pixels arranged in a matrix.

The right projection system 251 is formed of a collimator lens that converts the image light outputted from the right LCD 241 into a parallelized light flux. The right light guide plate 261 as the right optical image display section 26 reflects the image light having exited out of the right projection system 251 along a predetermined optical path and eventually guides the image light to user's right eye RE. The right projection system 251 and the right light guide plate 261 are also collectively referred to as a "light guide unit."

The left display driver 24 has the same configuration as that of the right display driver 22. The left display driver 24 includes a receiver (Rx) 54, the left backlight (BL) control section 202 and the left backlight (BL) 222, which function as a light source, the left LCD control section 212 and the left LCD 242, which function as a display device, and the left projection system 252. The left backlight control section 202 and the left backlight 222 function as a light source. The left LCD control section 212 and the left LCD 242 function as a display device. The left backlight control section 202, the left LCD control section 212, the left backlight 222, and the left LCD 242 are also collectively referred to as an "image light generation unit." The left projection system 252 is formed of a collimator lens that converts the image light outputted from the left LCD 242 into a parallelized light flux. The left light guide plate 262 as the left optical image display section 28 reflects the image light having exited out of the left projection system 252 along a predetermined optical path and eventually guides the image light to user's left eye LE. The left projection system 252 and the left light guide plate 262 are also collectively referred to as a "light guide unit."

When the user views an outside scene through the right optical image display section 26 and the left optical image display section 28, the head mounted display 100 displays an image based on image data in such a way that the image is superimposed on the outside scene.

The target detection section 171 controls and causes the camera 61 to perform image capturing to acquire a captured image. The captured image is outputted as color image data or monochrome image data from the camera 61. Instead, the camera 61 may output an image signal, and the target detection section 171 may generate image data that complies with a predetermined file format from the image signal.

The target detection section 171 analyzes the acquired captured image data to detect a target object contained in the captured image data. The target object is an object or a person present in the image capturing direction of the camera 61, that is, in the directions of the user's sight lines.

The target detection section 171 searches the captured image for an image that conforms to the detection feature data 124 and detects a conforming image as an image of the target object.

Figure 3:
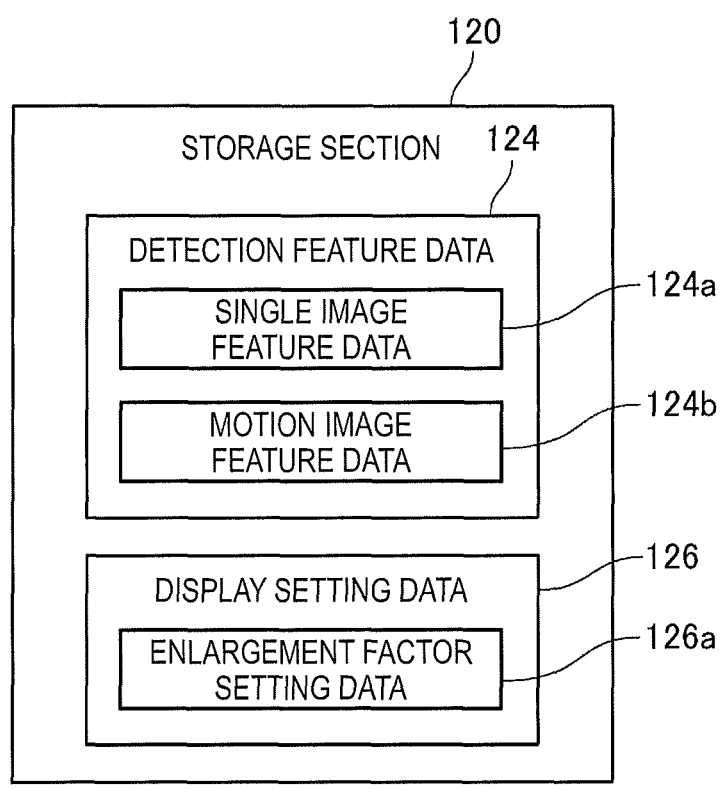
FIG. 3 is a descriptive diagram showing an example of data stored in a storage section.

FIG. 3 shows an example of the configuration of the detection feature data 124 and the display setting data 126 stored in the storage section 120.

The detection feature data 124 is data on the amount of feature of an image detected from the captured image. In the present embodiment, the detection feature data 124 contains single image feature data 124*a* and motion image feature data 124*b*. The single image feature data 124*a* is data on the amount of feature applied to a single captured image. The target detection section 171, when it uses the single image feature data 124*a*, performs a matching process of detecting a portion that conforms to the single image feature data 124*a* in a single captured image.

The motion image feature data 124*b* is data on the amount of feature applied to a plurality of captured images. The target detection section 171, when it uses the motion image feature data 124*b*, acquires captured images from the camera 61 multiple times and determines differences between the plurality of acquired captured images. The camera 61 can perform image capturing at predetermined time intervals and output captured image data whenever the image capturing is performed. That is, the camera 61 functions as a motion image camera that performs image capturing at a frame rate corresponding to the time intervals described above. In this case, the target detection section 171 can determine changes in the motion images by determining differences between the plurality of captured images captured with the camera 61 at different points of time. It can be said that the motion image feature data 124*b* is data on the amount of feature applied to changes in motion images. The target detection section 171 performs a matching process of detecting a portion that conforms to the motion image feature data 124*b* in the differences between the captured images.

In the present embodiment, whether the detection feature data 124 used by the target detection section 171 is the single image feature data 124*a* or the motion image feature data 124*b* is set in advance. The target detection section 171, when it is set to use the single image feature data 124*a*, acquires a single captured image from the camera 61 and performs the matching process. In contrast, the target detection section 171, when it is set to use the motion image feature data 124*b*, temporarily stores, whenever acquiring a captured image from the camera 61, the captured image in the storage section 120. The target detection section 171 then acquires the plurality of captured images stored in the storage section 120, determines differences between the acquired images, and performs the matching process based on the motion image feature data 124*b* on the differences.

Based on a result of the matching process, the target detection section 171 identifies a target object contained in the captured image captured with the camera 61. That is, the target detection section 171, when it detects an area that conforms to the single image feature data 124*a* in the captured image or an area that conforms to the motion image feature data 124*b* in the differences between the captured images, sets the subject contained in the detected area to be a target object.

The distance detection section 173 determines the distance to the target object detected by the target detection section 171. For example, the distance detection section 173 determines the distance to the target object based on the size of the image of the target object detected by the target detection section 171 in the captured image from the camera 61.

The head mounted display 100 may instead include a distance meter that detects the distance to a target object by using a laser beam or an ultrasonic wave. The distance meter, for example, includes a light source that emits a laser beam and a light receiver that receives the laser beam emitted from the light source and reflected off a target object, and the distance meter detects the distance to the target object based on the state of the received laser beam. The distance meter may instead be, for example, a distance meter based on an ultrasonic wave. That is, the distance meter may include a sound source that emits an ultrasonic wave and a detector that detects the ultrasonic wave reflected off a target object, and the distance meter may detect the distance to the target object based on the reflected ultrasonic wave. The distance meter can still instead be a combination of the distance meter using a laser beam and the distance meter using an ultrasonic wave. A distance meter of this type is preferably provided in the right holder 21 or the right display driver 22 in the image display unit 20 and may be disposed in a surface aligned with the light control plates 20A with the distance meter facing forward. The direction along which the distance meter measures the distance desirably coincides with the direction of user's sight lines, as in the case of the image capturing direction of the camera 61.

The distance detection section 173 detects the distance from the camera 61 or the distance meter to a target object, and the distance can be considered to be the distance from the user of the head mounted display 100 to the target object.

Further, in a case where a target object detected by the target detection section 171 is not a specific object, the center of a captured image, for example, is assumed to be an imaginary target object, and the distance detection section 173 detects the distance to the imaginary target object.

The image generation section 177 extracts and processes part of a captured image from the camera 61 to generate a display image. In the present embodiment, the image generation section 177 cuts out a predetermined-size area containing a feature detected by the target detection section 171 from the captured image to generate a display image. When the target detection section 171 uses the motion image feature data 124*b* to detect a target object from a plurality of captured images, the image generation section 177 cuts out an area containing the target object detected by the target detection section 171 from the latest captured image.

The display image generated by the image generation section 177 is displayed in displayable areas of the image display unit 20 under the control of the image display control section 176. The size according to which the display image is displayed is set in advance. For example, the size is roughly so set that the display image does not prevent the user to view an outside scene. The image generation section 177 therefore cuts out part of a captured image in accordance with the display size of the display image.

The image generation section 177 generates a display image in such a way that part of a captured image containing a feature detected by the target detection section 171 is displayed in a readily viewable manner. The process carried out by the image generation section 177 is therefore not limited to the process of enlarging the area extracted from the captured image as described above. For example, the display image may be formed by surrounding the target object, which is present in the area extracted from the captured image, with a circular or rectangular frame or a frame having any other shape. Still instead, for example, the display image may be generated by adding a balloon, an arrow, or any other decoration to the target object so that the user readily recognizes the target object. The decoration in this case is an image stored in advance for the decoration purpose and can be called an auxiliary image or an enhancement image. Further, the luminance or color tone of the area containing the target object may be changed, or the luminance of the target object and a portion therearound may, for example, be increased.

To add a decoration to a target object detected based on the single image feature data 124a or the motion image feature data 124b, data on the decoration may be contained in the single image feature data 124a and the motion image feature data 124b.

The image generation section 177, when it cuts out an image containing a target object detected by the target detection section 171, may cut out an image of the target object and a portion therearound. In this case, since the user can clearly see that the display image is an enlarged image of part of the captured image, the user can view, for example, a far portion that is hard to see in the form of an enlarged image. Further, the image generation section 177 may cut out part of a captured image along the contour of a target object. In this case, the cutout image can be combined with another background image and the combined image can be displayed, or the cutout image can be processed so as to form 3D (stereoscopic) image and the 3D (stereoscopic) image can be displayed in the image display unit 20.

The image generation section 177 further determines an enlargement factor based on the distance detected by the distance detection section 173. When an image of the portion cut out from a captured image is displayed under the control of the image display control section 176, the image generation section 177 processes the cutout image so as to allow the user to view an enlarged version of the cutout image. The image generation section 177 therefore determines the size of the image cut out from the captured image based on the size (resolution or number of image dots) in accordance with which the display image is displayed in the displayable areas of the image display unit 20 and the enlargement factor. The image generation section 177 then carries out an enlargement process of converting the size of the cutout image in accordance with the display size (or resolution conversion process). The image cut out from the captured image is thus enlarged, whereby the user can view an enlarged version of the cutout image.

The size of the display image enlarged by the image generation section 177 and visually recognized by the user is affected by the specifications of the image display unit 20.

To allow the image generation section 177 appropriately to manage and adjust the enlargement factor in accordance with which an image cut out from a captured image, it is, for example, preferable to set in advance the image size in a case where the size of an image cut out from a captured image is equal to the size of an outside scene in the field of view of the user (that is, enlargement factor is one). That is, the size of an image cut out by the image generation section 177 in a case where the size of a display image visually recognized by the user is not enlarged or reduced is set in advance. With reference to the size, the image generation section 177 cuts out an image in accordance with a target enlargement factor and enlarges the image.

The enlargement factor in accordance with which the image generation section 177 enlarges an image may, for example, be determined in correspondence with the distance detected by the distance detection section 173.

FIG. 3 shows an example in which the display setting data 126 stored in the storage section 120 contains enlargement factor setting data 126a, which relates the distance to a target object detected by the distance detection section 173 to the enlargement factor. The enlargement factor setting data 126a is data that specifies the distance detected by the distance detection section 173 and the enlargement factor and contains, for example, a table that allows stepwise determination of the enlargement factor or a computing equation and parameters that allow calculation of the enlargement factor from the distance. Based on the enlargement factor setting data 126a, the image generation section 177 can determine the enlargement factor from the distance detected by the distance detection section 173. The enlargement factor setting data 126a may further contain a setting used in a case where the image generation section 177 does not perform the enlargement or a setting used in a case where the image generation section 177 generates no display image. For example, the enlargement factor setting data 126a may contain a setting that does not allow generation or display of a display image when the distance to a target object detected by the distance detection section 173 is shorter than a preset distance. When the image generation section 177 does not generate or output data on a display image, the image display control section 176 displays no display image.

The display setting data 126 may further contain data set in advance in relation to image display in addition to the enlargement factor setting data 126a, such as setting value data on a default display size of an image displayed in the image display unit 20 and setting value data on display color adjustment.

The image display control section 176 controls the display control section 190 to cause the image display unit 20 to display an image based on data on a display image generated by the image generation section 177.

The voice processing section 170 acquires a voice signal contained in the content, amplifies the acquired voice signal, and supplies the amplified voice signal to a speaker (not shown) in the right earphone 32 and a speaker (not shown) in the left earphone 34, which are connected to the connection member 46. For example, when a Dolby (registered trademark) system is employed, relevant processing is performed on the voice signal, and the right earphone 32 and the left earphone 34 output sounds differentiated in terms, for example, of frequency.

The voice processing section 170 further acquires voice collected by the microphone 63, converts the collected voice into digital voice data, and carries out a process relating to voice. For example, the voice processing section 170 may perform speaker recognition in which features are extracted from the acquired voice and modeled to individually recognize voices of a plurality of persons and identify a speaker on a voice basis.

The three-axis sensor 113, the GPS 115, and the communication section 117 are connected to the control section 140. The three-axis sensor 113 is a three-axis acceleration sensor, and the control section 140 can acquire values detected with the three-axis sensor 113 to detect motion of the control unit 10 and the direction of the motion.

The GPS 115 includes an antenna (not shown), receives GPS (global positioning system) signals, and determines the current position of the control unit 10. The GPS 115 outputs the current position and current time determined based on the GPS signals to the control section 140. The GPS 115 may further have a function of acquiring the current time based on information contained in the GPS signals and correcting the time clocked by the control section 140 in the control unit 10.

The communication section 117 performs wireless data communication that complies with a wireless LAN (WiFi (registered trademark)) standard or a Bluetooth (registered trademark) standard.

The interface 180 connects a variety of image supply apparatus OA, which are content supply sources, to the control unit 10. A content supplied by the image supply apparatus OA contains still images or motion images and may contain voice. Examples of the image supply apparatus OA may include a personal computer (PC), a mobile phone terminal, and a game console. The interface 180 can, for example, be a USB interface, a micro-USB interface, and a memory card interface.

The image supply apparatus OA can instead be connected to the control unit 10 via a wireless communication line. In this case, the image supply apparatus OA performs wireless communication with the communication section 117 and transmits data in a content by using a wireless communication technology, such as Miracast (registered trademark).

Figure 4:
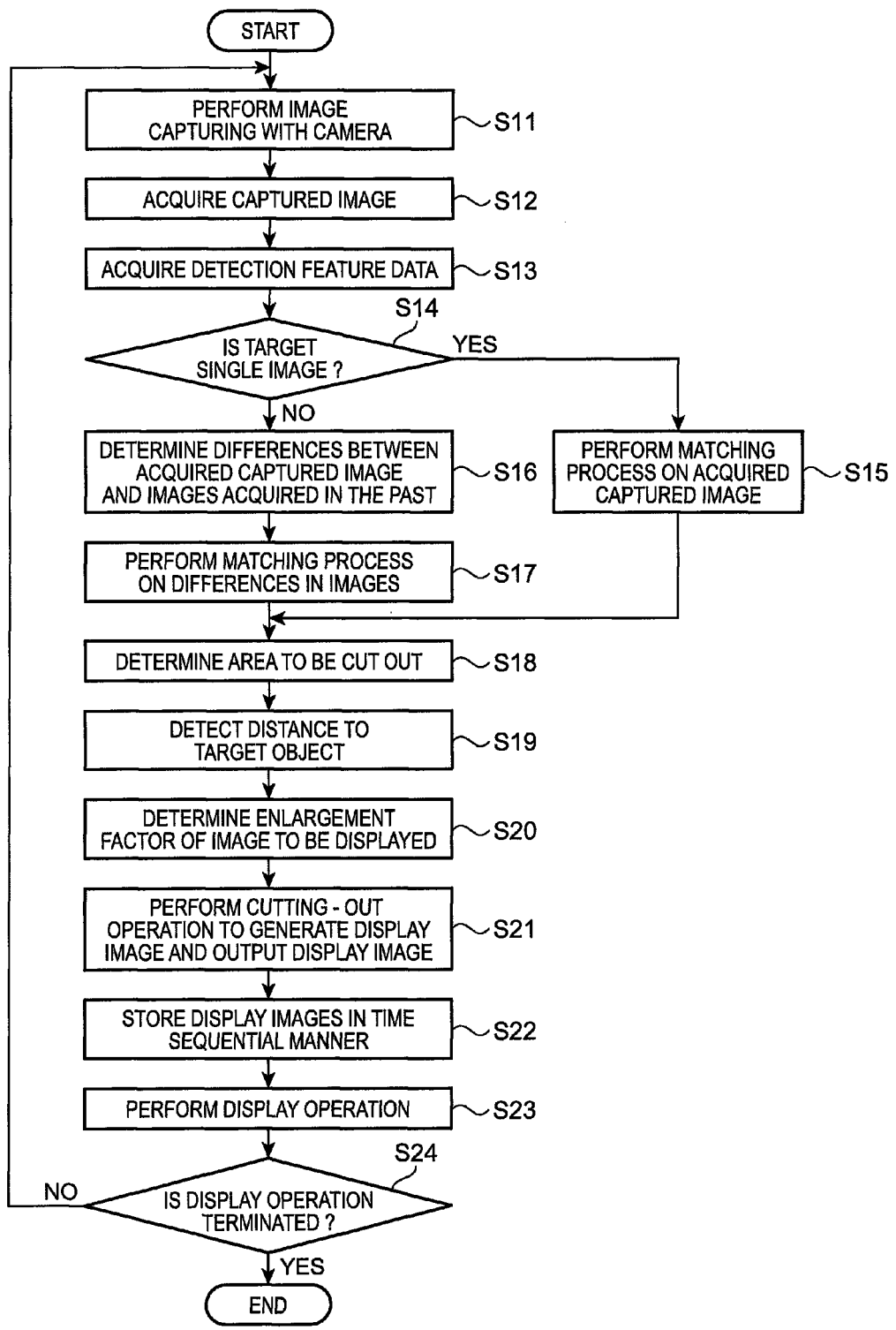
FIG. 4 is a flowchart showing action of the head mounted display.

FIG. 4 is a flowchart showing action of the head mounted display 100. In the action, when the user views an outside scene through the right optical image display section 26 and the left optical image display section 28, the image display unit 20 displays part of a captured image generated by capturing the outside scene.

Figure 5A:
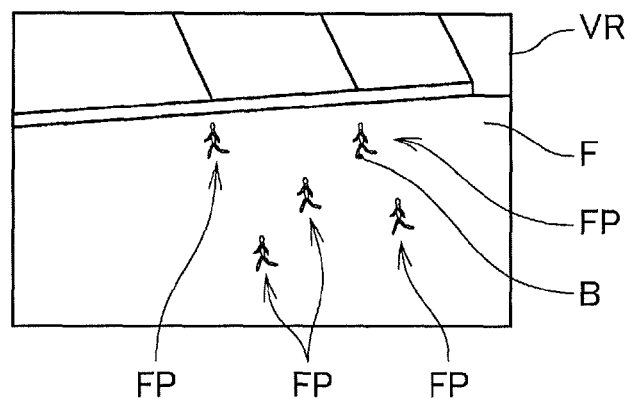
FIGS. 5A to 5D are descriptive diagrams showing typical application examples of the head mounted display.
Figure 5B:
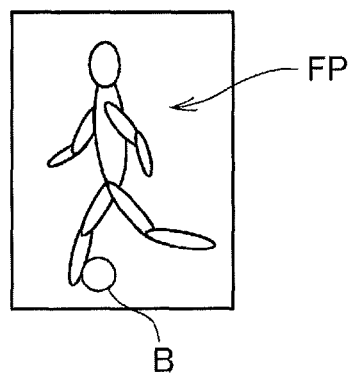
Figure 5C:
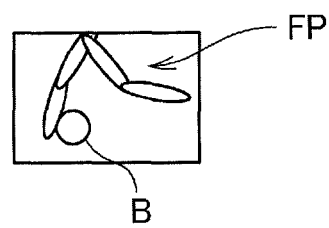
Figure 5D:
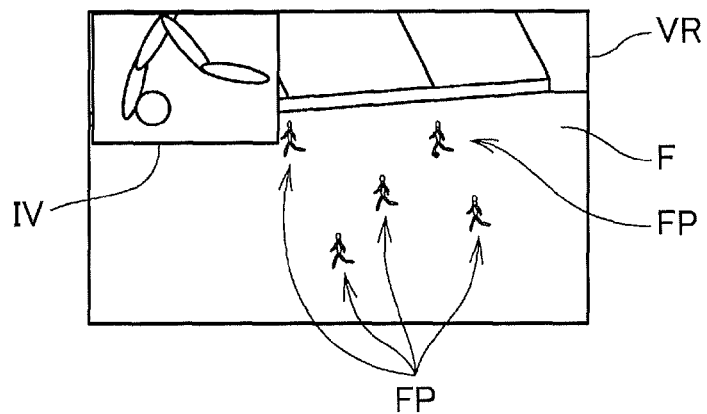

FIGS. 5A to 5D are descriptive diagrams showing how the head mounted display 100, which acts as shown in FIG. 4, displays an image. FIG. 5A shows an example of a field of view VR of the user. FIGS. 5B and 5C show examples of an image cut out from a captured image. FIG. 5D shows an example of the field of view VR of the user in a case where a display image is displayed.

In the control section 140 of the head mounted display 100, the target detection section 171 causes the camera 61 to perform image capturing (step S11) to acquire a captured image (step S12). The target detection section 171 acquires the single image feature data 124a or the motion image feature data 124b from the storage section 120 (step S13) and evaluates whether a target in the acquired detection feature data is a single captured image or a plurality of captured images (step S14). The evaluation can be performed based on whether the single image feature data 124a has been specified or the motion image feature data 124b has been specified as the detection feature data to be used.

When a single captured image is processed (step S14; YES), the target detection section 171 performs the matching process on the captured image acquired in step S12 by using the single image feature data 124a (step S15) and proceeds to step S18.

When a plurality of captured images are processed (step S14; NO), the target detection section 171 determines differences between the captured images acquired in step S12 and captured images captured in the past and temporarily stored in the storage section 120 (step S16). The target detection section 171 performs the matching process based on the motion image feature data 124b on the determined differences (step S17) and proceeds to step S18.

In step S18, the target detection section 171 determines an area to be cut out from the captured image. The area to be determined in this process is an area containing the target object detected by the target detection section 171, but a detailed cutout range is determined by the image generation section 177 in step S21, which will be described later. The area determined in step S18 is therefore a temporal area and may, for example, be the position of the center of the area to be cut out or the contour of the target object.

The example shown in FIG. 5A is a case where the user views a football game from a spectator seat. In the example, a football field F and a plurality of players FP who play in the field F are visible, and a scene in which one player FP is keeping a ball B is visible. In the example, since the user is present in a position far away from the field F, the players FP and the ball B in the field of view VR are seen as small objects.

The image capturing range (angle of view) of the camera 61 is, for example, equal to the field of view VR, and a captured image therefore contains the field F, the players FP, and the ball B.

It is now assumed that the target detection section 171 performs the matching process on the captured image based on the single image feature data 124a to detect an image of the ball B as a target object. In this case, the target detection section 171 detects the ball B in step S15, and an area containing the ball B is determined as the cutout area in step S18.

The distance detection section 173 subsequently detects the distance to the target object contained in the area determined by the target detection section 171 in step S18 (step S19).

The image generation section 177 then determines the enlargement factor based on the distance detected by the distance detection section 173 and the enlargement factor setting data 126a stored in the storage section 120 (step S20). The image generation section 177 determines the size and position of an image to be cut out from the captured image based on the determined enlargement factor, actually cuts out an image, and outputs the cutout image as a display image (step S21). In step S21, the image generation section 177 may perform the size conversion, resolution conversion, or other types of processing described above. Further, the image generation section 177 outputs no display image when the enlargement factor setting data 126a corresponding to the distance detected by the distance detection section 173 is so set that no display is performed.

FIGS. 5B and 5C show examples of the display image outputted from the image generation section 177. The image generation section 177 cut outs an area containing an image of the ball B from the captured image in accordance with settings set in advance in relation to the image cutting-out operation. The settings set in advance in relation to the image cutting-out operation include the aspect ratio of an image to be cut out and the size of the image in a case where the enlargement factor is one. In the example shown in FIG. 5B, an area containing the ball B and the whole body of the player FP who is keeping the ball B is cut out, and the cutout image is outputted as the display image. In the example shown in FIG. 5C, an area containing the ball B and a portion containing the ball B and having a predetermined size is cut out, and the cutout image is outputted as the display image. In the example shown in FIG. 5C, only part of the body of the player FP who is keeping the ball B is contained. When the single image feature data 124a is used as data on the amount of feature for detecting the ball B, whether an image to be cut out by the image generation section 177 contains the whole body of the player FP or part of the body of the player FP is determined based on the enlargement factor and other factors.

The image display control section 176 stores the display image outputted from the image generation section 177 in the storage section 120 (step S22). The storage section 120 stores display images in a time sequential manner. Therefore, when the processes shown in step S11 to S24 in FIG. 4 are repeatedly carried out, the storage section 120 stores a plurality of display images in a time sequential manner. Motion images can be reproduced through continuous display of the plurality of display images. For example, the control section 140 can reproduce and display the display images stored in the storage section 120 in accordance with instruction operation performed on the operation section 135.

The image display control section 176 outputs the display image outputted from the image generation section 177 in step S21 to the display control section 190, which causes the image display unit 20 to display the display image (step S23).

The control section 140 then evaluates whether or not the display operation is terminated (step S24). When the display operation is continued (step S24; NO), the control section 140 returns to step S11. When the display operation is terminated in accordance, for example, with operation detected by the operation section 135 (step S24; YES), the control section 140 causes the display control section 190 to stop the display operation and terminates the entire process.

FIG. 5D shows a state in which the image display unit 20 displays the display image. The field F is visible as an outside scene in the field of view VR, as in FIG. 5A, and an image IV is so displayed that it is superimposed on part of the field of view VR. The image IV is the display image displayed by the image display unit 20. Since the image IV is an image generated by enlarging part of the outside scene, the user can view the outside scene viewed through the image display unit 20 and part of the outside scene at the same time.

The target detection section 171, when it repeatedly carries out the processes in step S11 to S17 in FIG. 4, may track the target object that the target detection section 171 has once detected. That is, the target detection section 171 detects a target object based on the single image feature data 124a or the motion image feature data 124b, then monitors changes in captured images from the camera 61, and tracks the motion of the detected target object. The target detection section 171 can thus detect the target object from the captured images under the detection operation without performing the matching processes in steps S15 and S17. The approach described above is effective when the camera 61 captures motion images at a predetermined frame rate (30 frames/second, for example) and the target detection section 171 detects a target object on a frame basis, because the processing burden can be reduced.

Each of the single image feature data 124a and the motion image feature data 124b is not limited to the amount of feature for detecting a specific target object. For example, the single image feature data 124a can be the amount of feature for detecting a captured image containing a specific feature, and the motion image feature data 124b can be the amount of feature for detecting motion images that change in a specific manner. In this case, the target detection section 171, when it detects a feature that conforms to the single image feature data 124a or the motion image feature data 124b in a captured image, sets a portion containing the feature to be a target object. In this case, the target object is not a specific object but is part of the captured image. The image generation section 177 may cut out the portion of the captured image that has been detected as the target object by the target detection section 171 and set the portion to be a display image.

Instead, the single image feature data 124a and the motion image feature data 124b may contain data on the amount of feature for a specific target object that allows detection of a specific one target object or a small number of target objects or may contain data on the amount of feature for general purposes that allows detection of a plurality of types of target object similar to each other.

In the examples shown in FIGS. 5B and 5C, for example, the target detection section 171 detects the ball B based on the single image feature data 124a. The single image feature data 124a may be data on the amount of feature for a specific target object that allows detection of a ball having a specific pattern (including color and shape of pattern) or may be data on the amount of feature for general purposes that allows detection of a spherical object. When the single image feature data 124a is data on the amount of feature for general purposes, the data may, for example, be the amount of feature that identifies only the shape, the amount of feature that identifies the shape and color, or the amount of feature that identifies one of a plurality of colors. Further, the single image feature data 124a may contain data that specifies the range of the difference from an acceptable amount of feature in addition to the data on the amount of feature. The same holds true for the motion image feature data 124b.

Specifically, when the detection feature data 124 is data on the amount of feature for general purposes that accepts variations in the face, hair, and clothing (such as uniform, shoes, cap, and bibs) of a specific person, a plurality of target objects can be detected, and further, the state of sunshine or illumination, brightness in the environment, and a change in color in a captured image due to sunlight can be handled. Further, having detected a target object, the target detection section 171 may track the target object in captured image data that are kept captured. In this case, when an image of the target object in the capture image data does not conform to the amount of feature during the tracking of the target object, the amount of feature may be calibrated. As a result, both in the case where data on the amount of feature for a specific target is used and the case where data on the amount of feature for general purposes is used, the target object can be detected and kept detected even when the color or the shape of the target object in a captured image deviates from the amount of feature due to sunshine and other factors.

Figure 6:
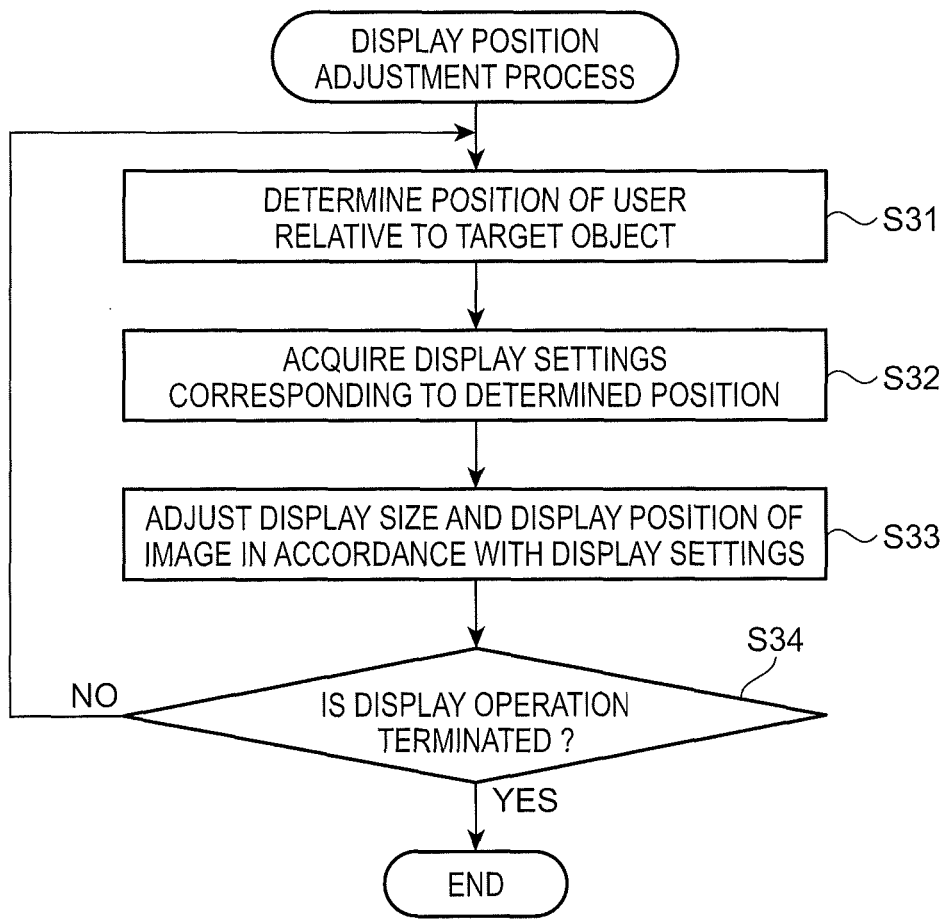
FIG. 6 is a flowchart showing action of the head mounted display.
Figure 7A:
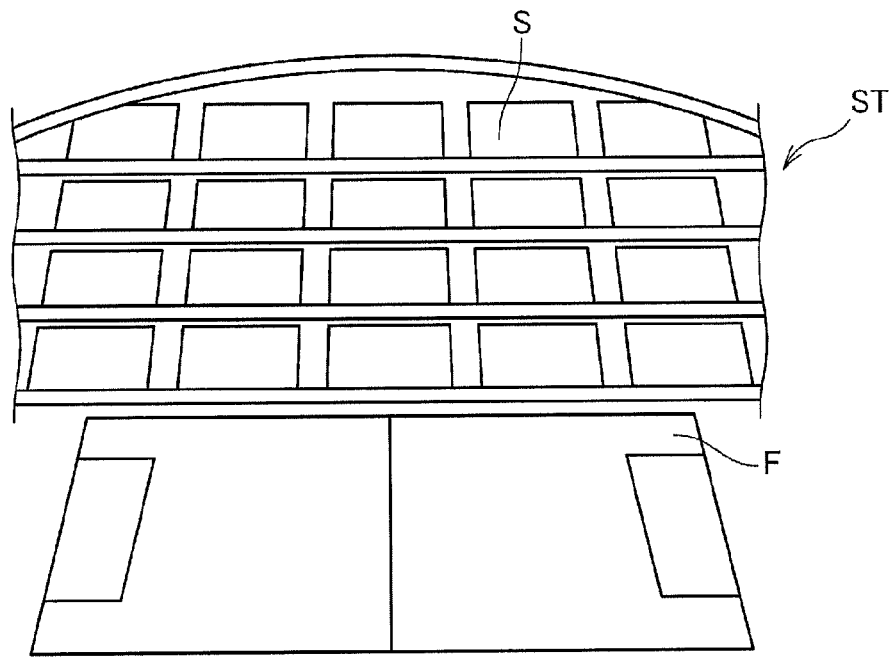
FIGS. 7A to 7C show an example of the action of the head mounted display.
Figure 7B:
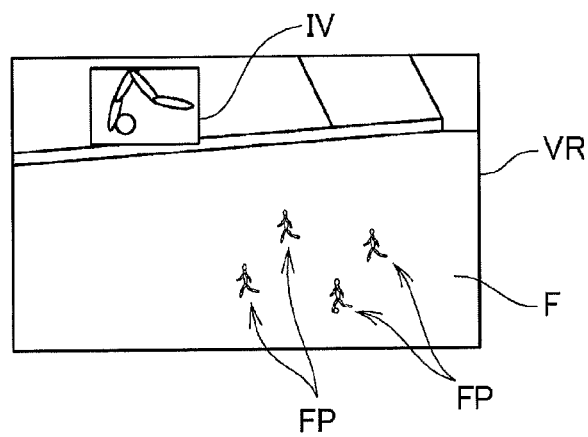
Figure 7C:
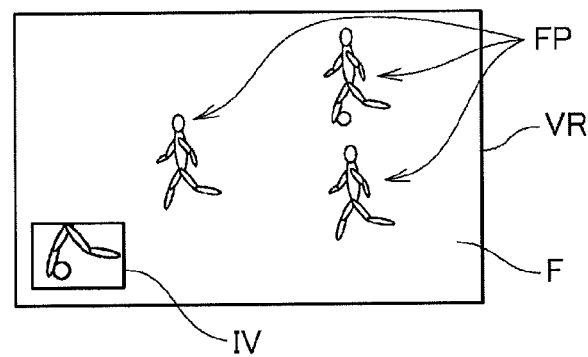

FIG. 6 is a flowchart showing action of the head mounted display 100 and shows action of adjusting display operation in correspondence with the position of the user who wears the head mounted display 100. FIGS. 7A to 7C are descriptive diagrams of the same action as that in shown in FIG. 6. FIG. 7A shows an example of the environment where the head mounted display is used, and FIGS. 7B and 7C show display examples.

The action shown in FIG. 6 is a process of adjusting the position where the image display unit 20 displays the image IV and the size of the image IV in correspondence with the position of the user. As described above, the head mounted display 100 is an apparatus that allows the user to view a captured image from the camera 61 and displayed in the image display unit 20 while viewing an outside scene. The direction in which the user views an outside scene through the image display unit 20 is strongly affected by the relative positional relationship between the user and a target object viewed by the user.

For example, consider a case shown in FIG. 7A where the user wears and uses the head mounted display 100 in a stadium ST having spectator seats S arranged in multiple floor layers (four layers in FIG. 7A). When the user is present in the fourth or third floor or any other upper-layer floor, the user looks down to view the field F. The direction along which the user desires to look is present below display areas of the right light guide plate 261 and the left light guide plate 262. In this case, the image display control section 176 displays a display image, for example, in a position above the display areas separate from the direction in which the user desires to look, so that the display image does not bother the user. The example shown in FIG. 7B is a case where the user views the players FP in the field F from an upper-layer floor, and the image display control section 176 displays the image IV in a portion above the display areas. In this case, the user can view the players FP in the field of view VR in a state in which the image IV does not bother the user. The example shown in FIG. 7C is a case where the user views the players FP in the field F from a lower-layer floor, and the image display control section 176 displays the image IV in a portion below the display areas. In this case, the user's sight lines approach the frontward direction, the image display control section 176 displays a reduced image IV in a position separate from the frontward direction. The user can therefore view the players FP in the field of view VR in a state in which the image IV does not bother the user.

The action shown in FIG. 6 can be performed at an arbitrary point of time after the display operation starts in step S23 in FIG. 4 and when a preset condition is satisfied or in response to user's operation performed on the control unit 10.

The image display control section 176 determines the relative positional relationship between a target object contained in an outside scene viewed by the user and the head mounted display 100 (step S31). The position of the head mounted display 100 may be determined based, for example, on the position detected by the GPS 115. The position of the head mounted display 100 may instead be determined based on the distance to the target object detected by the distance detection section 173 from captured image data from the camera 61. Still instead, in a state in which a position identification system using WiFi (registered trademark) is in operation in the environment in which the head mounted display 100 is used, the communication section 117 may identify the position of the head mounted display 100 by performing WiFi communication. Still instead, when the position of the head mounted display 100 is specified by input operation performed on the operation section 135, the specified position may be acquired as the position of the head mounted display 100.

The image display control section 176 refers to the display setting data 126 stored in the storage section 120 and acquires settings relating to display operation corresponding to the position determined in step S31 (step S32). The settings include the position where the image IV is displayed, a defined value or a maximum value of the display size of the image IV, and other parameters. The image display control section 176 adjusts the display size of the image IV and the position where the image IV is displayed in accordance with the settings acquired in step S32 (step S33) and evaluates whether or not the display operation is terminated (step S34).

The control section 140 repeatedly carries out the processes in steps S31 to S33 as long as the display operation is not terminated (step S34; NO) and terminates the entire process when the display operation is terminated (step S34; YES).

As described above, the head mounted display 100 according to the first embodiment to which the invention is applied is a display apparatus worn on use's body before use and includes the image display unit 20, which transmits an outside scene and displays an image in a visually recognizable manner along with the outside scene, and the camera 61, which performs image capturing along the directions of user's sight lines. The control section 140 of the head mounted display 100 includes the image generation section 177, which generates a display image from a captured image from the camera 61, and the image display control section 176, which causes the image display unit 20 to display the display image generated by the image generation section 177. As a result, a display image based on a captured image captured along the directions of user's sight lines can be so displayed that the display image is superimposed on a target object visible as the outside scene. A novel method for using an image displayed by the display apparatus can therefore be provided in the form of an effective combination of an outside scene outside the display apparatus and a displayed content, for example, by enhancing the way the user views the outside scene based on a captured image generated by capturing the outside scene or presenting another way of viewing the outside scene.

The head mounted display 100 further includes the distance detection section 173 or any other detection section that detects the state in which the head mounted display 100 is used. The image display control section 176 adjusts the form in accordance with which the image display unit 20 displays a display image in correspondence with the state in which the head mounted display 100 is used. As a result, the display size, the display position, and other aspects of an image displayed in the image display unit 20 can be adjusted in correspondence with the environment in which the head mounted display 100 is used and the way in which the user uses the head mounted display 100, whereby the display operation can be performed in accordance with the way in which the user visually recognizes an outside scene.

The distance detection section 173 or any other detection section detects the position of the head mounted display 100, and the image display control section 176 adjusts the form in accordance of which the display image is displayed in correspondence with the detected position of the head mounted display 100, whereby the display operation can be performed based on the position of the head mounted display 100 in accordance with the way in which the user visually recognizes the outside scene. Specifically, the image display control section 176 adjusts at least one of the display position and the display size of the display image in such a way that the display image is separate from the center of the directions of user's sight lines. The center of the directions of user's sight lines refers, for example, not only to an intersection of a central axis of the sight lines in a case where the user views an outside scene through the image display unit 20 and the entire display area where the image display unit 20 displays an image but also to a portion in the vicinity of the intersection. In this case, the display image is not displayed in a position that directly faces user's sight lines, but the user visually recognizes the display image in a position that does not directly face the sight lines (center of sight lines). Therefore, according to the embodiment of the invention, an image captured with the camera 61 can be so displayed that the image does not bother the user who views an outside scene. For example, the display image can be so displayed that it does not hide a target object that the user desires to view.

Further, since the image generation section 177 cuts out and enlarges part of a captured image from the camera 61 to generate a display image, the captured image captured along user's sight lines can be displayed as an enlarged image. The user can therefore view an outside scene and a portion thereof along the directions of the sight lines as an enlarged image.

Moreover, since the image generation section 177 cuts out an area that satisfies a preset condition in a captured image from the camera 61 to generate a display image, a captured image that satisfies the preset condition can be displayed. For example, when a captured image that satisfies user's preference or interest is captured, the image display unit 20 can display the captured image and show it to the user.

The head mounted display 100 further includes the target detection section 171, which detects a target object in the directions of user's sight lines from a captured image from the camera 61. The image generation section 177 cuts out an area containing an image of the target object detected by the target detection section 171 from the captured image from the camera 61 to generate a display image. Therefore, when a target object is present in the directions of user's sight lines, an image of the target object can be presented to the user.

The head mounted display 100 further includes the distance detection section 173, which detects the distance between the target object detected by the target detection section 171 and the user. The image generation section 177 enlarges part of a captured image from the camera 61 in accordance with an enlargement factor corresponding to the distance detected by the distance detection section 173 to generate a display image, whereby an image of the target object can be enlarged in accordance with the enlargement factor corresponding to the distance to the target object present in the directions of user's sight lines, and the enlarged image can be presented to the user.

Further, the image generation section 177 acquires a plurality of captured images captured with the camera 61 at different points of time and identifies areas that satisfy a preset condition in the plurality of captured images to generate display images, whereby a complicated condition can be set on the plurality of captured images, and images based on captured images that satisfy the condition can be presented to the user.

The image generation section 177 acquires a plurality of captured images captured with the camera 61 at different points of time, evaluates whether the differences between the plurality of captured images satisfy a preset condition, and cuts out part of the acquired captured images to generate display images when the differences satisfy the preset condition. Therefore, since display images can be generated and displayed based on the differences between the plurality of captured images, motion images formed of a plurality of continuous images can, for example, be used to generate display images based on changes in the images and display the display images.

The image display control section 176 stores the display images generated by the image generation section 177 in the storage section 120 in a time sequential manner and reproduces and displays the display images stored in the storage section 120 when the operation section 135 detects operation that instructs reproduction of the display images. The image display control section 176 can display motion images by sequentially reproducing the plurality of display images stored in a time sequential manner at a predetermined frame rate. In this case, the user can view motion images formed of recorded imaged enlarged around the directions of the sight lines. In this process, before reproducing and displaying the display images stored in the storage section 120, the image display control section 176 may change the enlargement factor in accordance with which the display images have been enlarged. For example, when the operation section 135 detects operation of specifying the enlargement factor, the enlargement factor may be changed in accordance with the operation. Further, in FIG. 5D, the display image is so displayed that it is superimposed on part of the field of view VR. However, when display images stored in the storage section 120 are reproduced and displayed, the display images may be displayed over the entire displayable areas of the image display unit 20.

Further, the image generation section 177 may adjust the transparency of the image IV. In the example shown in FIG. 5D, the transparency is zero and no outside scene is therefore visible through the portion on which the image IV is superimposed. The image generation section 177 may adjust the transparency based on the brightness of the outside scene superimposed on the image IV, the luminance of the image IV, and other factors.

In the embodiment described above, the description has been made with reference to the case where the target detection section 171 recognizes a target object by using the single image feature data 124a or the motion image feature data 124b stored in the storage section 120. The single image feature data 124a, which is stored in the storage section 120 in advance, may also be generated or changed in accordance with user's operation during the use of the head mounted display 100. For example, it is conceivable to configure the head mounted display 100 in such a way that during the display operation in which the image display unit 20 displays a captured image from the camera 61, part of the display image can be selected in accordance with operation of the trackpad 14. In this configuration, when the user selects part of the display image, the target detection section 171 may detect an image of a person or an object from the selected portion and generate single image feature data 124a or motion image feature data 124b from the detected image. The head mounted display 100 may instead be operated in response to a voice command. In this case, the control section 140 detects user's voice with the microphone 63, and the voice processing section 170 analyzes the detected voice to recognize the voice command. During the operation in which the head mounted display 100 causes the image display unit 20 to display a captured image from the camera 61, when the user issues an instruction in the form of a voice command to select part of a display image, the target detection section 171 may detect an image of a person or an object from the selected portion and generate single image feature data 124a or motion image feature data 124b from the detected image. Specifically, when an image of a football game is captured and displayed, as shown in FIG. 5A, and the user issues an instruction in the form of a voice command to "track the player having a uniform number of 11," the target detection section 171 may detect the numeral "11" from a captured image from the camera 61, extract a portion containing the detected numeral, and determine the amount of feature to generate single image feature data 124*a* or motion image feature data 124*b*.

Second Embodiment

Figure 8:
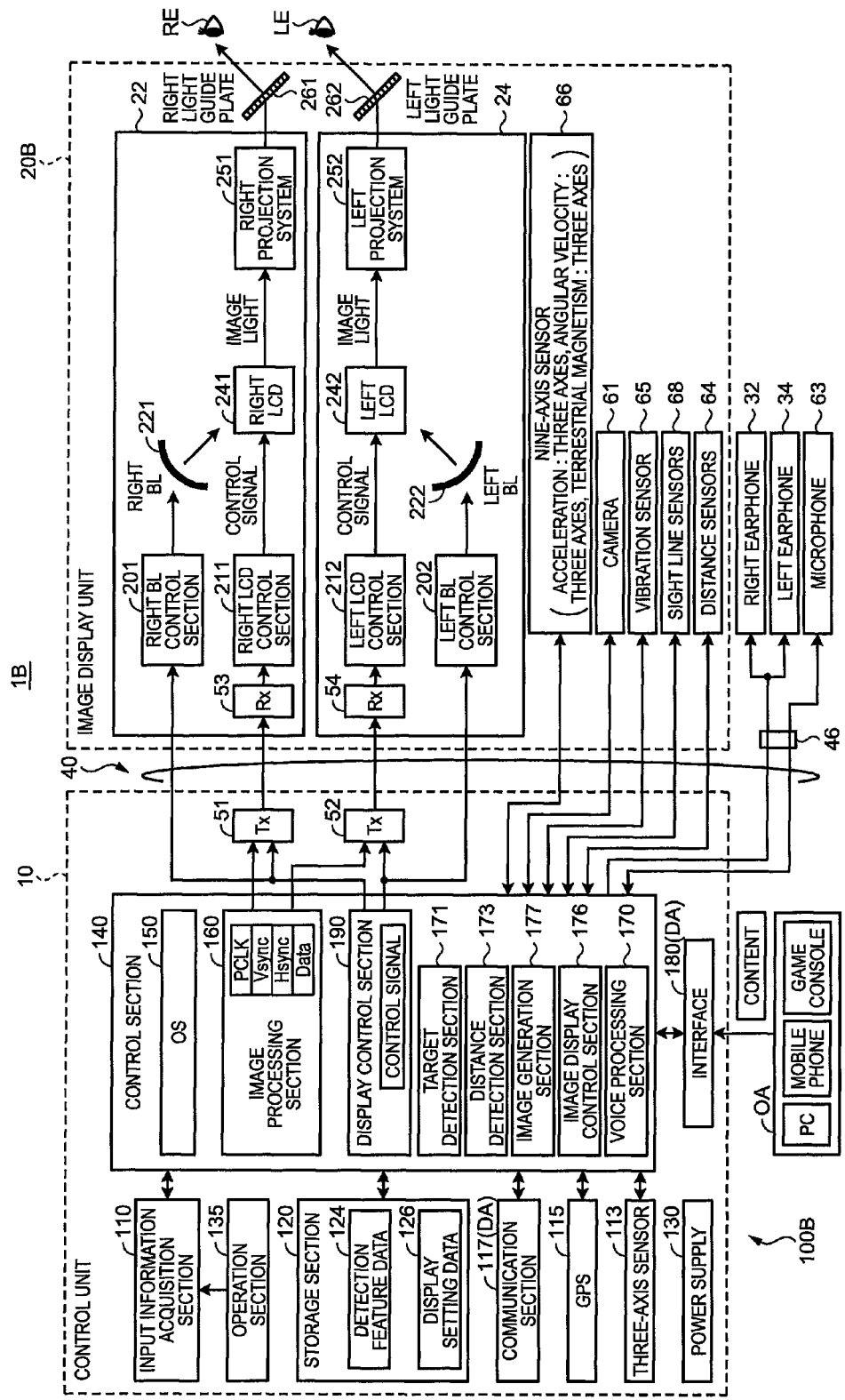
FIG. 8 is a block diagram showing a functional configuration of a head mounted display according to a second embodiment.
Figure 9A:
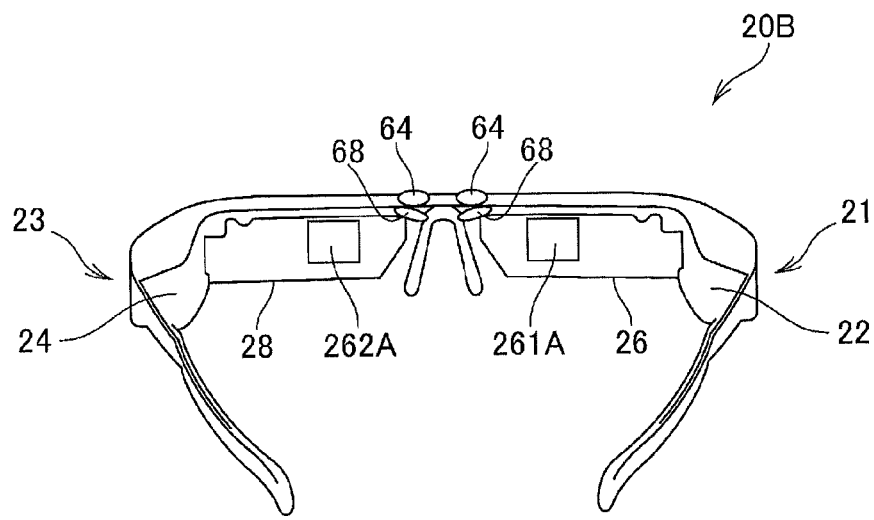
FIGS. 9A and 9B show the configuration of key portions of an image display unit.
Figure 9B:
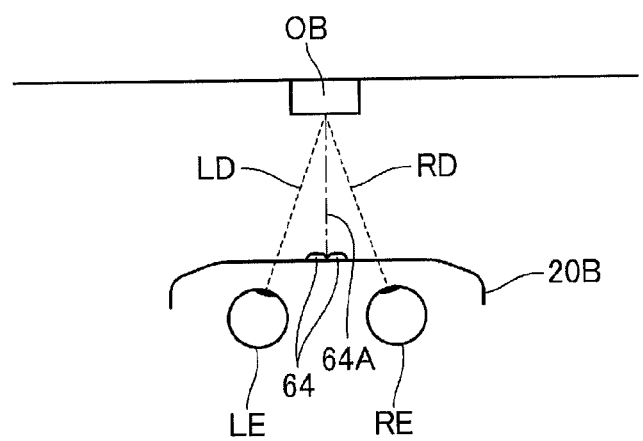

FIG. 8 is a block diagram showing a functional configuration of a head mounted display 100B according to a second embodiment. The head mounted display 100B has a configuration in which the image display unit 20 is replaced with an image display unit 20B in the head mounted display 100 described in the first embodiment. In the second embodiment, the portions configured in the same manner as in the first embodiment have the same reference characters and will not be described. FIGS. 9A and 9B show the configuration of key portions of the image display unit 20B. FIG. 9A is a perspective view of the key portions of the image display unit 20B viewed from the side where user's head is present, and FIG. 9B describes the directions of sight lines.

The image display unit 20B includes distance sensors 64 and sight line sensors 68 in addition to the configuration of the image display unit 20 (FIG. 2). The head mounted display 100 and the head mounted display 100B are the same in terms of the other points, and the head mounted display 100B can perform the action of the head mounted display 100 in the first embodiment described above.

Reference characters 261A and 262A shown in FIG. 9A denote half-silvered mirrors formed on the right light guide plate 261 and the left light guide plate 262, respectively, and correspond to the display areas where an image is displayed and which can transmit an outside scene. The image display unit 20 in the first embodiment described above are also provided with the half-silvered mirrors 261A and 262A.

The distance sensors 64 are disposed in a portion along the boundary between the right optical image display section 26 and the left optical image display section 28, as shown in FIG. 9A. In a state in which the user wears the image display unit 20B, the positions of the distance sensors 64 are roughly at the middle between user's eyes in the horizontal direction but above user's eyes in the vertical direction. The distance sensors 64 detect the distance to a target object under measurement located in a preset measurement direction.

For example, the distance sensors 64 detect the distance to a target object OB, which is located at an intersection of a sight line RD of user's right eye RE and a sight line LD of user's left eye LE, as shown in FIG. 9B. In this case, a direction 64A, in which the distance sensors 64 performs the distance detection, is the frontward direction with respect to the image display unit 20B.

Each of the distance sensors 64 includes, for example, a light source, such as an LED and a laser diode, and a light receiver that receives light emitted from the light source and reflected off a target object under measurement. In this case, the distance sensors 64 perform distance measurement based on triangulation or time difference under the control of the distance detection section 173. Each of the distance sensors 64 may instead include a sound source that emits an ultrasonic wave and a detector that detects the ultrasonic wave reflected off a target object under measurement. In this case, the distance sensors 64 perform distance measurement based on the difference in time spent until the ultrasonic wave is reflected under the control of a position detection section 162, which will be described later. Instead, each of the distance sensors 64 may instead include a light source and a light receiver or a sound source and a detector, and the distance detection section 173 may perform the distance measurement.

The measurement direction of the distance sensors 64 in the present embodiment is the frontward direction with respect to the head mounted display 100B and coincides with the image capturing direction of the camera 61.

The sight line sensors 68 are disposed on the user-side surface of the image display unit 20B, as shown in FIG. 9A. The sight line sensors 68 are provided as a pair in a central portion between the right optical image display section 26 and the left optical image display section 28 in such a way that the sight line sensors 68 correspond to user's right eye RE (FIG. 9B) and user's left eye LE (FIG. 9B). The sight line sensors 68 are formed, for example, of a pair of cameras that capture images of user's right eye RE and left eye LE. The sight line sensors 68 perform image capturing under the control of the control section 140 (FIG. 8), and the control section 140 detects light reflected off the eyeball surfaces of the right eye RE and the left eye LE or images of the pupils thereof from captured image data to identify the directions of the sight lines. Further, the sight line sensors 68, which capture images of user's right and left eyes, can detect, when the user closed the eyes, that the eyes have been closed.

The distance sensors 64 and the sight line sensors 68 are connected to the control section 140 via the connection section 40, as shown in the block diagram of FIG. 8. The distance detection section 173 can control the distance sensors 64 to cause them to detect the distance to a target object. The distance detection section 173 may instead detect the distance to a target object based on captured image data from the camera 61, as described in the above first embodiment.

The head mounted display 100B according to the second embodiment can capture action of any of user's hands, legs, eyes, and other portions with the camera 61 and can be operated based on the actions of the user. The camera 61 can capture images of user's hands, and the sight line sensors 68 can capture images of user's eyes and detect motion thereof. Further, when the camera 61 is a wide-angle camera or a leg camera (not shown) facing downward with respect to the image display unit 20B is provided, images of user's feet can be captured.

The image display control section 176 detects user's motion based on captured image data from the camera 61, captured image data from the leg camera, or detection results from the sight line sensors 68. Further, the image display control section 176, when the detected user's motion conforms to preset motion, detects the motion as operation.

In this case, the image display control section 176 functions as an action detection section, the image display control section, and a voice detection section.

User's motion to be detected as operation by the image display control section 176 is contained in the detection feature data 124 stored in the storage section 120. The detection feature data 124 contains data on the amount of feature for extracting images of user's hands and legs from a captured image from the camera 61, data on the amount of feature of motion of the extracted images of user's hands and legs, and other types of data.

The image display control section 176 may instead be configured to be capable of detecting user's speaking action. In this case, the voice processing section 170 converts voice collected with the microphone 63 into digital voice data, and the image display control section 176 processes the digital voice data. That is, the image display control section 176 generates the amount of feature of the voice from the digital voice data that lasts for a predetermined time length, evaluates whether or not the amount of feature conforms to the amount of feature for voice recognition contained in the detection feature data 124, and detects voice operation based on a result of the evaluation. In this process, the image display control section 176 may perform voice recognition on the digital voice data to generate text data on the spoken content and detect operation when the text data contains a preset character string. In this case, the detection feature data 124 may contain dictionary data for the voice recognition and data on the character string to be detected as operation.

Figure 10:
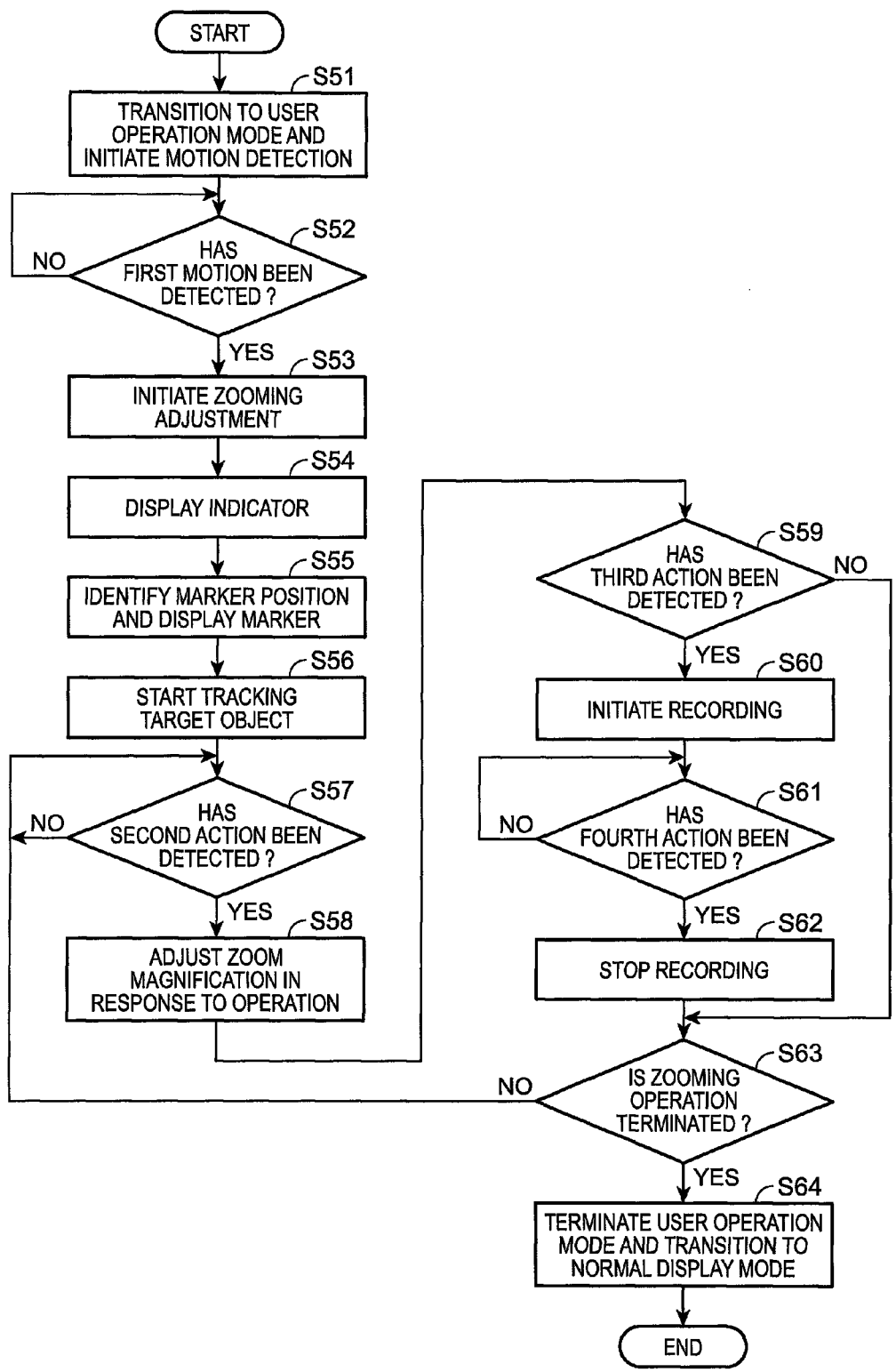
FIG. 10 is a flowchart showing action of the head mounted display.

Action of the image display control section 176 that corresponds to user's action will be described with reference to FIGS. 10 and 11A to 11D. FIG. 10 is a flowchart showing action of the head mounted display 100B, and FIGS. 11A to 11D show display examples in the image display unit 20B.

The action shown in FIG. 10 can be performed at an arbitrary point of time after the display operation starts in step S23 in FIG. 4 and when a preset condition is satisfied or in response to user's operation performed on the control unit 10.

The control section 140 transitions to a "user operation mode" that is an action mode for action based on user's motion and initiates detection of user's motion (step S51). The motion detection is performed based on captured image data from the camera 61, data on detection results from the sight line sensors 68, or digital voice data generated by the voice processing section 170, as described above.

The image display control section 176 evaluates whether or not the detected user's motion conforms to motion set as "first motion" in advance (step S52). The first motion is, for example, user's action of closing (shutting) one of the eyes, user's action of keeping legs together, and user's action of speaking "start zooming." The first action may instead be user's action of forming a circle with a thumb (first finger) and a forefinger (index finger) or a middle finger. Still instead, the first action may be user's action of facing the hands each other and placing them within the image capturing rage of the camera 61.

Until action that conforms to the first action is detected (step S52; NO), the image display control section 176 waits for operation. When action that conforms to the first action is detected (step S52; YES), the image display control section 176 initiates zooming adjustment (step S53). In the zooming adjustment, an indicator is first displayed in the image display unit 20B based on the function of the image display control section 176 (step S54). The indicator contains characters or images showing that the user can perform zooming operation and is so displayed that the user can visually recognize the indicator superimposed on an outside scene. The indicator may contain characters or images that guide or describe operation that the user needs to perform to instruct zooming adjustment.

The image display control section 176 identifies a marker position that serves as the center of the zooming adjustment and displays a marker in the identified position (step S55). The marker is an image or a symbol showing the user the center of the zooming adjustment and is displayed by the image display unit 20B.

As a method for identifying the marker position, there is, for example, a method used when the user closes one of the eyes as the first action and including detecting the sight line of the unclosed eye and the direction of the sight line is used to set the marker position. In this method, when user's eyes are both open, no single marker position is possibly identified because the directions of the sight lines do not necessarily coincide with each other. However, user's right or left eye may be set in advance as a dominant eye through setting operation performed on the control unit 10, and the direction of the sight line of the thus set dominant eye may be used to set the marker position. In this case, the dominant eye may be automatically determined.

When the user performs the action of forming a circle with a thumb and a forefinger or a middle finger as the first action, the center of the circle can be set to be the marker position. When the user performs the action of facing the hands each other and placing them within the image capturing range of the camera 61 as the first action, the center between the hands may be set to be the marker position.

When the image display control section 176 can detect a plurality of target objects present in the directions of user's sight lines from a captured image from the camera 61 and detect features of the detected target objects, the marker position may be identified by allowing the user to speak a word that specifies a target object. That is, the user may speak a feature of a person or an object that is one of the target objects contained in the captured image from the camera 61, and the image display control section 176 may select the one target object based on the spoken word and identify the target object as the marker position. In this case, the marker position can be specified by allowing the user to speak a word that identifies an object, a place, or a person, such as "ball," "goal," or "number 10."

Figure 11A:
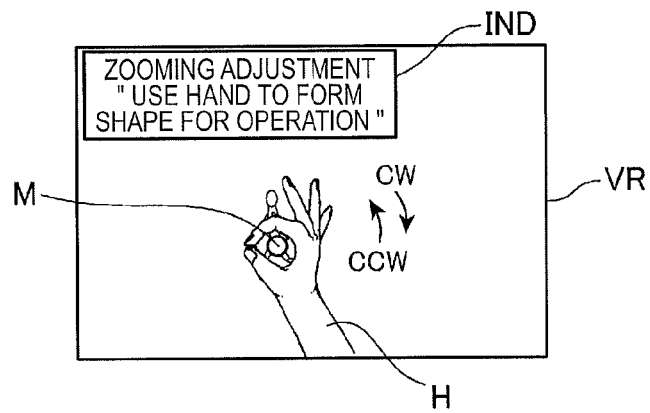
FIGS. 11A to 11D show display examples in the head mounted display.

FIG. 11A shows a display example in a state in which a marker has been recognized. In FIG. 11A, the image display unit 20B displays an indicator IND, and the user forms a circle with fingers. In response to the circle forming action of the user, the center of the circle is identified as the marker position, and a marker M is displayed. The user visually recognizes the indicator IND and the marker M in the field of view of the user and views user's hand H as an outside scene.

The image display control section 176 initiates action of tracking the target object in the identified marker position, moving the image accordingly, and keeping the marker position located at the center of the display image (step S56).

The image display control section 176 then detects second action of specifying the zoom magnification or specifying a change in the zoom magnification (step S57). The second action can, for example, be user's action of forming a circle with a thumb and a forefinger or a middle finger and rotating the hand with the circle maintained. In this case, when the hand is rotated in the clockwise direction, the image display control section 176 increases the zoom magnification, whereas when the hand is rotated in the counterclockwise direction, the image display control section 176 decreases the zoom magnification. A change in the zoom magnification can be a unit amount set in advance. In this case, the user can adjust the zoom magnification to a desired value by repeating the second action.

Figure 11B:
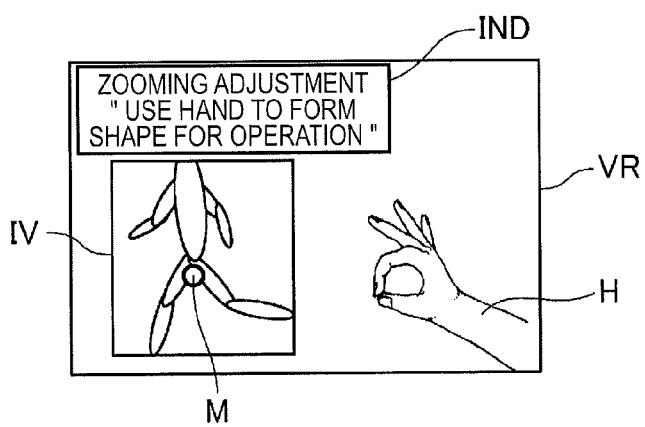
Figure 11C:
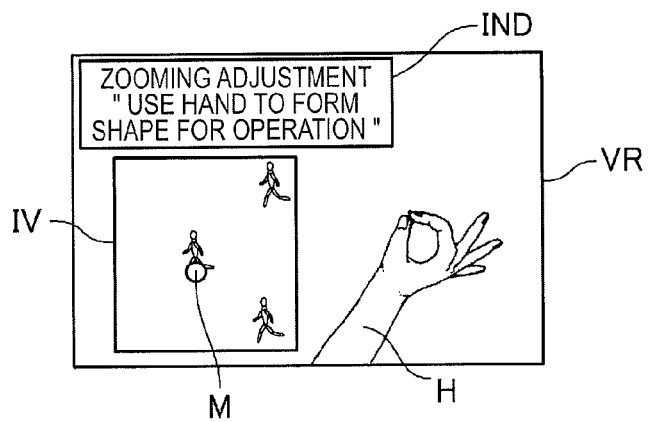

In the example shown in FIG. 11A, the user places the right hand within the image capturing range of the camera 61 and forms a circle with fingers. In this state, when the user moves the hand in such a way that the circle formed by the right hand is rotated in the clockwise direction (CW in FIG. 11A), the zoom magnification increases in the image IV, the center of which is the marker M, as shown in FIG. 11B. That is, the image IV is enlarged around the marker M, and the enlarged image IV is displayed. Instead, when the user in the state shown in FIG. 11A moves the right hand in such a way that the circle formed by the right hand is rotated in the counterclockwise direction (CCW in FIG. 11A), the zoom magnification decreases, as shown in FIG. 11C. In FIG. 11C, the image IV is visually recognized in the form of an image reduced around the marker M.

When the user forms no circle but places one hand within the image capturing range of the camera 61, user's action of bringing the hand toward the camera 61 can be identified as the second action corresponding to an increase in the zoom magnification. Further, user's action of bringing the hand away from the camera 61 can be identified as the second action corresponding to a decrease in the zoom magnification.

Figure 11D:
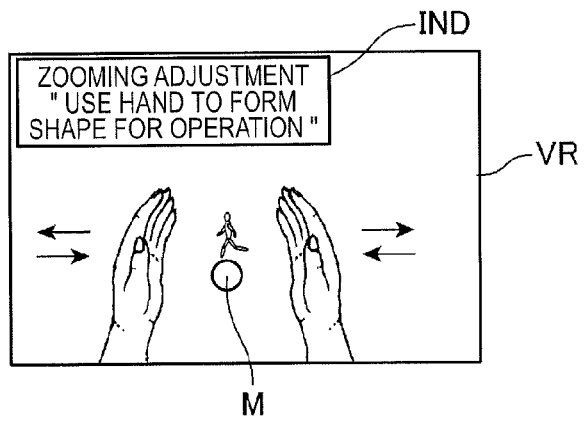

Further, for example, when the user performs the action of facing the hands each other as the first action, the center between the hands may be set to be the marker M, as shown in FIG. 11D. In this case, user's action of increasing or decreasing the distance between the hands, as indicated by the arrows in FIG. 11D, can be identified as the second action. In this case, the image display control section 176 increases the zoom magnification when the user increases the distance between the hands, whereas decreasing the zoom magnification when the user decreases the distance between the hands.

The target detection section 171 detects an object corresponding to any of user's limbs from a captured image from the camera 61 and identifies the position of the marker M based on the motion or the position of the detected object, as illustrated in FIGS. 11A to 11D. The object to be detected is not limited to a hand, an arm, and a leg of the user and may be part of limbs, such as a finger and a palm.

Specifically, a thumb and a forefinger can be placed within the image capturing range of the camera 61, and the marker M can be displayed in a position between the thumb and the forefinger. Further, the action of decreasing the distance between the thumb and the forefinger may be assigned to an instruction to decrease the zoom magnification, and the action of increasing the distance between the thumb and the forefinger may be assigned to an instruction to increase the zoom magnification. Any of the other fingers may be used to perform the operation described above, or three or more fingers and motion thereof may be detected. For example, three or more fingers may be detected simultaneously, and motion of each of the fingers, a change in relative positional relationship among the plurality of fingers, or any other behavior may be detected as the motion. The process corresponding to the motion of a finger is not limited to the identification of the marker M and a change in the zoom magnification and may be volume adjustment of outputted voice or light control adjustment of a displayed image.

The second action may be user's action of moving a leg. User's action of putting the right leg ahead of the left leg can be identified as the second action corresponding to an increase in the zoom magnification, and the zoom magnification may be increased in accordance with the length of the period during which the right leg is put ahead of the left leg. In this case, user's action of putting the right leg behind the left leg can be identified as the second action corresponding to a decrease in the zoom magnification, and the zoom magnification may be decreased in accordance with the length of the period during which the right leg is put behind the left leg. The zoom magnification may instead be changed in accordance with the amount of the right leg put ahead of or behind the left leg. In this case, the indicator may display markings showing a change in the zoom magnification and the correspondence of the zoom magnification to the amount of one leg put ahead of or behind the other leg.

Further, the second action may be user's spoken voice. The user may speak a word that specifies zoom-up, zoom-down, or the zoom magnification in the form, for example, of a numeral, and the image display control section 176 may adjust the zoom magnification.

Unless action that conforms to the second action is detected (step S57; NO), the image display control section 176 waits for user's operation. When action that conform to the second action is detected (step S57; YES), the image display control section 176 changes the zoom magnification (step S58). The image display control section 176 then detects third action.

The third action corresponds to operation of issuing an instruction to initiate recording. The third action can, for example, be user's action of placing one hand within the image capturing range of the camera 61 and inclining the hand, user's action of putting the left leg ahead of the right leg, or user's action of closing both eyes. The third action may instead be user's action of speaking a word that instructs to initiate recording. When the third action is detected (step S59; YES), the image display control section 176 initiates recording of captured images from the camera 61 and digital voice data on voice collected with the microphone 63 and generated by the voice processing section 170 (step S60).

The image display control section 176 then detects fourth action (step S61). The fourth action corresponds to operation of issuing an instruction to stop the recording. For example, when the user has performed action of placing one hand within the image capturing range of the camera 61 and inclining the hand as the third action, the fourth action can be action of moving the inclined hand back to the original position. When the user has put the left leg ahead of the right leg as the third action, the fourth action can be action of moving the left leg backward. The fourth action can instead be user's action of closing both eyes. The fourth action can still instead be user's action of speaking a word that instructs to stop the recording. When the fourth action is detected (step S61; YES), the image display control section 176 stops the recording (step S62).

The image display control section 176 then evaluates whether or not the zooming adjustment operation is terminated (step S63). The image display control section 176 performs the evaluation in step S63 also when no third action is detected in a predetermined period in step S59 (step S59; NO).

When user's operation performed on the operation section 135, or a hand, a leg, an eye (eyelid), voice, or any other type of action as in the first action to the fourth action instructs to stop the zooming operation (step S63; YES), the image display control section 176 terminates the user operation mode, stops displaying the indicator, transitions to a normal display mode (step S64), and terminates the entire process. When a result of the evaluation in step S63 shows that the user does not desire to terminate the zoom operation (step S63; NO), the image display control section 176 returns to step S57.

As described above, the head mounted display 100B can be operated in response to user's action of moving a hand, a leg, or an eye (eyelid), speaking a word, or performing any other type of behavior. A variety of types of instruction operation can therefore be performed without direct operation of the control unit 10, whereby the head mounted display 100B can be operated, for example, with the control unit 10 and the image display unit 20B worn on the body or the clothing and the hands kept free or in what is called a hands-free state. Further, since the head mounted display 100B can be operated in response to eye, voice, or leg action, the head mounted display 100B can be operated even when the hands are used in other types of activity and hence the user cannot manually operate the head mounted display 100B.

Further, in steps S59 and S61, when a hand or a leg is placed within the image capturing range of the camera 61 as the third action and the fourth action, the image display control section 176 may carry out a process of preventing the hand or the leg from being contained in recorded images. That is, the image display control section 176, when it detects hand or leg action as the third action and the fourth action, may carry out a process of removing an image of the hand or the leg detected as the third action and the fourth action from images to be recorded. For example, the image of the hand or the leg can be removed by trimming frames of captured images from the camera 61.

Further, before the action shown in FIG. 10, the control section 140 may perform calibration that relates the directions of the sight lines detected by the sight line sensors 68 to the image capturing range of the camera 61. A result of the calibration may be stored along, for example, with the detection feature data 124 in the storage section 120.

Further, the action shown in FIG. 10 has been described with reference to the case where the zoom magnification is adjusted in steps S53 to S58 and the recording is then performed in steps S59 to S62, but only the recording may be performed. Moreover, in the first action detection step of step S52, when action set in advance as the third action is detected, the action in step S60 may be performed.

Further, in addition to the hand and leg action, action associated with an indicating object other than a hand or a leg can be detected as the first action to the fourth action. In this case, the indicating object only needs to be an object having a feature that can be extracted by the image display control section 176 from a captured image from the camera 61 and may be an object having a specific shape, color, or pattern. Further, an indicating object can be a device that emits light that does not fall within a visible region, such as infrared light and ultraviolet light, as long as the camera 61 can receive and detect light of this type. Operation of moving any of the indicating objects described above along a predetermined trajectory within the image capturing range of the camera 61 or placing any of the indicating objects within the image capturing range of the camera 61 can be identified as any of the first action to the fourth action. When any of the indicating objects is a wearable device that can be worn on user's body or clothing, such as a wristwatch, operability can be further improved.

Further, the first action to the fourth action or the action listed above as the action for identifying the marker position as described above can not only be used to instruct the adjustment of the zoom magnification and the recording but also be applied, for example, to operation of reproduction of recorded images.

Figure 12:
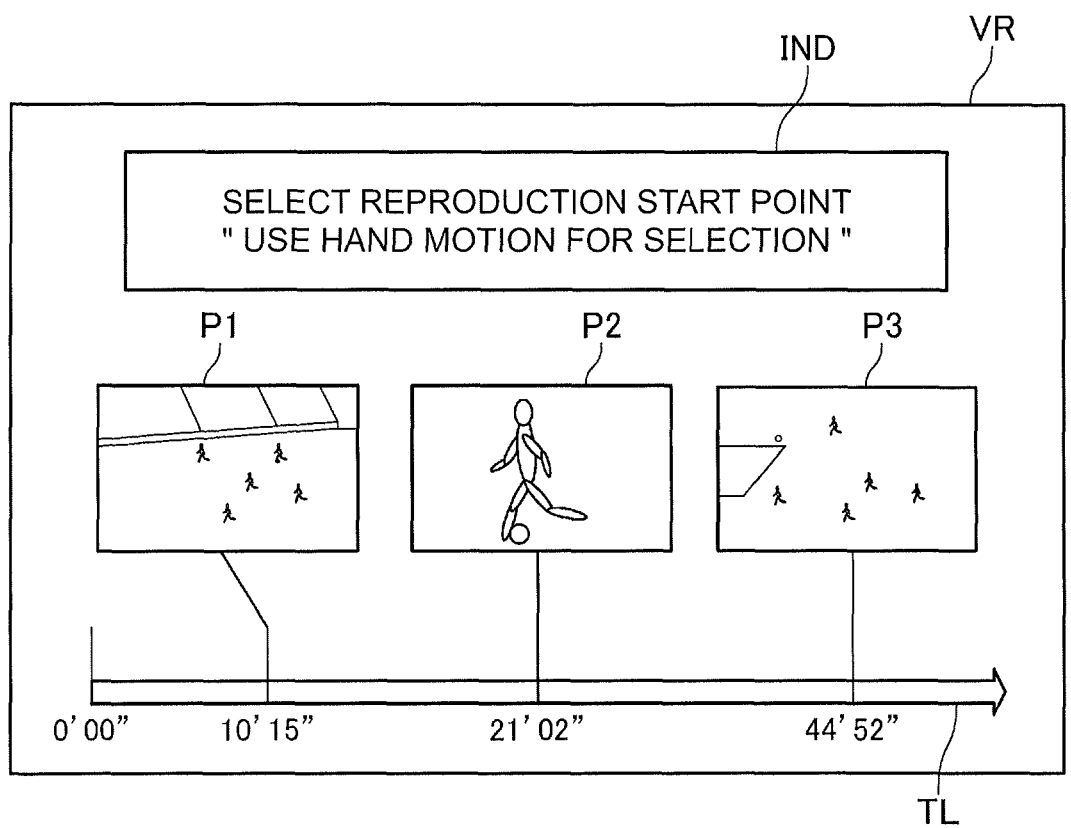
FIG. 12 shows another display example in the head mounted display.

FIG. 12 shows a display example in a case where an instruction to reproduce recorded motion images is issued. The display example shown in FIG. 12 is displayed, for example, when an instruction of the reproduction is issued in response to operation performed on the control unit 10. In FIG. 12, a timeline TL showing entire recorded motion images is displayed in the field of view VR. For the frames at specific points of time along the timeline TL, the image display control section 176 generates and displays thumbnail images P1 to P3. The point of time at which a thumbnail image is generated and displayed may be specified during recording by user's specific action, such as any of the first action to the fourth action or may be automatically selected by the image display control section 176 in accordance with the temporal length of recorded images. The image display control section 176 may instead automatically select the point of time based on a change in images. In the state in which the display example shown in FIG. 12 is displayed, the time at which reproduction is initiated can be selected from the thumbnail images P1 to P3 based, for example, on the directions of the sight lines.

As described above, according to the second embodiment to which the invention is applied, the image display control section 176 detects user's action based on a captured image from the camera 61 and adjusts the form in accordance with which a display image is displayed in correspondence with the detected user's action. For example, the zoom magnification is adjusted. Therefore, by allowing the user to perform action an image of which can be captured with the camera 61, the form in accordance with which a display image is displayed can be adjusted. Instead, the image display control section 176 may detect voice collected with the microphone 63 and adjust the form in accordance with which a display image is displayed in correspondence with a result of the voice detection.

The image display control section 176 detects user's action based on a captured image from the camera 61. The image display control section 176 can then extract and process an area identified based on the user's action, for example, an area around the marker M to cause the image generation section 177 to generate a display image.

The image display control section 176 identifies directions corresponding to the directions of user's sight lines and detects a target object present in the directions of user's sight lines from a captured image from the camera 61. The image generation section 177 may then extract and process an area containing an image of the target object to generate a display image. Instead, when directions corresponding to the directions of user's sight lines are identified, the marker M may be displayed in a position corresponding to the identified directions.

Further, directions corresponding to the directions of user's sight lines may be determined by detecting the sight line of user's dominant eye. Moreover, motion of user's hand or leg may be detected from a captured image from the camera 61, and the position of the marker M may be identified based on the motion.

The invention is not limited to the configuration in each of the embodiments described above and can be implemented in a variety of aspects to the extent that they do not depart from the substance of the invention.

In the first embodiment described above, as an example of the operation in which the image generation section 177 cuts out an area that satisfies a preset condition from a captured image from the camera 61, the case where the image generation section 177 cuts out an area containing a target object detected in the matching process performed by the target detection section 171 has been described. The invention is not limited to the case described above. For example, the image generation section 177 may detect and cut out an area that satisfies a preset condition in a captured image to generate a display image. For example, in a case where as the condition under which the image generation section 177 cuts out an area from a captured image, the position and size of the area are set in advance, the image generation section 177 cuts out an area located in the set position and having the set size from a captured image irrespective of a detection result from the target detection section 171. Further, the condition under which an area is cut out may instead be a condition that specifies the color or luminance in a captured image, and the target detection section 171 is not necessarily required to perform some type of processing.

Further, the process carried out when the image generation section 177 generates a display image from a captured image is not limited to the process of cutting out and enlarging part of the captured image. For example, the entire captured image as it is or the captured image after resolution conversion may be used as a display image. Moreover, for example, the image generation section 177 may cut out a plurality of areas from a captured image to generate a plurality of display images and display a plurality of images IV simultaneously in the field of view VR. Further, the image generation section 177 or the image display control section 176 may change or adjust as appropriate the position where the display image is displayed.

In the first and second embodiments described above, the image capturing direction of the camera 61 may be movable relative to the image display units 20 and 20B. For example, the camera 61 may be attached to a frame of each of the image display units 20 and 20B via a rotatable arm or link or a flexible arm so that the orientation of the camera 61 is changeable without movement of the image display unit 20 or 20B. In this case, the angle of the optical axis or the image capturing direction of the camera 61 with respect to the image display units 20 and 20B may be detectable. Specifically, a rotation sensor may be provided at a pivotal portion of the link or the arm that supports the camera 61, or the camera 61 itself may be provided with a gyro sensor or an acceleration sensor. In this case, the directions of user's sight lines may be determined based on the direction of the optical axis of the camera 61. When the optical axis of the camera 61 is movable, since the user can orient the optical axis of the camera 61 in a desired direction, the orientation of the optical axis of the camera 61 can be considered as the direction of user's attention or a direction associated therewith. The position of the head mounted display 100 can therefore be determined, for example, in step S31 in FIG. 6 based on the orientation of the optical axis of the camera 61. Further, the position of the marker can be identified in step S55 in FIG. 10 based on the orientation of the optical axis of the camera 61.

Further, the image display control section 176 may control the motion in images displayed by the image display unit 20. For example, the image display control section 176 may control images displayed in the image display unit 20 based on the motion of the image display unit 20 that can be detected from detected values from the nine-axis sensor 66 and/or the GPS 115. When the acceleration or speed of the motion of the image display unit 20 reaches or exceeds a threshold in the period during which images generated from captured images from the camera 61 are displayed, the image display control section 176 may suppress the motion in the images displayed in the image display unit 20 or reverse the motion in the displayed images in the direction opposite the movement of the image display unit 20. In this case, the image display control section 176 may change display images generated by the image generation section 177 or display part of the display images. According to the configuration described above, when the user's head around which the head mounted display 100 is worn moves fast and displayed images therefore greatly change, the motion in images displayed by the image display unit 20 can be suppressed, whereby discomfort felt by the user can be reduced. The function described above is called a stabilizer function. The stabilizer function can be switched between ON and OFF in response to operation performed on the operation section 135. Further, as described with reference, for example, to FIGS. 10 and 11A to 11D, the stabilizer function can be switched between ON and OFF in response to motion of user's hand, leg, or eye or user's voice.

The stabilizer function described above is also applicable to a case where a target object detected by the target detection section 171 moves at a high speed in captured images. For example, when the ball is detected as a target object, as illustrated in FIGS. 5A to 5C, the movement speed of the ball may be determined from changes in the position of the ball in captured images, and changes in displayed images or the movement of the ball in a displayable position in the image display unit 20 may be suppressed when the acceleration or speed of the ball is greater than or equal to a threshold. Instead, when the movement speed or the acceleration determined from changes in the position of the ball in captured images is greater than or equal to a threshold, the image generation section 177 may temporarily stop the process of extracting an image of the target object to generate a display image. Still instead, the image generation section 177 may lower the enlargement factor according to which an extracted image is enlarged, change the angle of view in the image capturing performed by the camera 61, or lower the zoom magnification in a case where the camera 61 has a zooming mechanism or a digital zoom function. As described above, it is advantageously expected that reducing the display size of an image of a target object displayed by the image display unit 20 allows the target object to be readily viewed even when the target object moves at a high movement speed.

Further, for example, in the embodiments described above, the description has been made of the case where the image generation section 177 determines the enlargement factor and the image generation section 177 cuts out and enlarges part of a captured image by using image processing in accordance with the enlargement factor. The invention is not limited to the case. For example, the camera 61 may has a zoom function, and the image generation section 177 may control the zoom magnification of the camera 61. In this case, the image generation section 177 may acquire a captured image captured at a zoom magnification specified by the image generation section 177 and cut out an image to generate a display image.

As the image display unit, the image display unit 20 may be replaced with an image display unit worn, for example, as a cap or any other image display unit worn based on another method. A display unit that displays an image in correspondence with user's left eye and a display unit that displays an image in correspondence with user's right eye may be provided. Moreover, the display apparatus according to any of the embodiments of the invention may, for example, be configured as a head mounted display incorporated in an automobile, an airplane, and other vehicles. Further, for example, the display apparatus may be configured as a head mounted display built in a helmet or other body protection gears or may be a head-up display (HUD) used with a windshield of an automobile. Still further, the image display unit 20 may be a display that forms an image on the retina in each user's eyeball, such as what is called a contact lens display attached to user's eyes (onto cornea, for example) when used and an implanted display embedded in each eyeball.

The invention can be applicable to an apparatus worn on user's body and is applicable to such an apparatus irrespective of whether or not the apparatus needs to be supported by using another method. For example, a binocular-type hand-held display used by a user who holds it with hands may be employed as the image display unit 20 in the present application. Although a display of this type requires the user to hold it with the hands in order to maintain the apparatus attached to the user, the apparatus falls within the range of the display apparatus according to the embodiments of the invention because the apparatus comes into contact with user's head or face when the user views an image displayed in the display. Further, even a display apparatus fixed to a floor surface or a wall surface, for example, by using support legs falls within the range of the display apparatus according to the embodiments of the invention as long as the display apparatus comes into contact with user's head or face when the user views an image displayed in the display.

Further, the image display unit 20 or only a display unit including a configuration involved in image display in the image display unit 20 may be worn on user's body, and the control unit 10 excluding the display unit or a control system including the control unit 10 and the control section 140 may be physically separated. For example, the image display unit 20 or a display unit formed of part of the image display unit 20 may be wirelessly connected to an apparatus including another control system to form a display apparatus, as in the case of the head mounted display 100. Examples of the apparatus including the control system may include a smartphone, a mobile phone, a tablet computer, a personal computer having a shape different from that of a tablet computer, and other existing electronic apparatus. The present application is, of course, applicable to a display apparatus of this type.

Further, in the embodiments described above, the description has been made of the case where the image display units 20 and 20B are separated from the control unit 10 and they are connected to each other via the connection section 40. The control unit 10 and the image display unit 20 can instead be integrated with each other, and the integrated unit can be worn around user's head.

Further, the control unit 10 and the image display units 20 and 20B are connected to each other via a longer cable or a wireless communication line, and the control unit 10 may, for example, be a mobile electronic apparatus including a notebook computer, a tablet computer, a desktop computer, a game console, a mobile phone, a smartphone, and a mobile media player, or any other dedicated apparatus.

Further, for example, the configuration that generates image light in the image display unit 20 may be a configuration including an organic EL (organic electro-luminescence) display and an organic EL controller. Moreover, an LCOS (liquid crystal on silicon) device (LCoS is a registered trademark), a digital micromirror device, or any other device can be used as the image light generation configuration. Further, for example, the invention is also applicable to a laser-retina-projection-type head mounted display. That is, a configuration in which the image generation section may include a laser light source and an optical system that guides a laser beam to user's eyes may be employed. In this configuration, the laser beam may be caused to enter each user's eye, and the retina may be scanned with the laser beam, so that the user is allowed to visually recognize an image. When a laser-retina-projection-type head mounted display is used, the "region of the image light generation unit through which image light is allowed to exit" can be defined as an image region recognized by user's eye.

As the optical system that guides image light to user's eyes, an employable configuration includes an optical member that transmits external light externally incident on the display apparatus and allows the external light along with image light to be incident on user's eyes. Another usable optical member may be disposed in a position in front of user's eyes and may coincide with part or the entirety of the field of view of the user. Still another employable optical system may be a scan-type optical system that sweeps, for example, a laser beam to form image light. The optical system does not necessarily guide image light through an optical member and may only have a function of guiding image light toward user's eyes based on refraction and/or reflection.

The invention is also applicable to a display apparatus that employs a scan optical system using a MEMS mirror and uses a MEMS display technology. That is, an image display device may include a signal light formation section, a scan optical system having a MEMS mirror that sweeps light outputted from the signal light formation section, and an optical member on which the light swept by the scan optical system forms a virtual image. In this configuration, the light outputted from the signal light formation section is reflected off the MEMS mirror, is incident on the optical member, is guided through the optical member, and reaches a virtual image formation plane. The MEMS mirror sweeps the light to form a virtual image on the virtual image formation plane, and the user captures the virtual image to recognize an image. The optical member in this case may be a multi-reflection light guide, such as the right light guide plate 261 and the left light guide plate 262 in the embodiments described above, or may be a half-silvered mirror.

The display apparatus according to any of the embodiments of the invention is not limited to a head mounted display and is applicable to a flat panel display, a projector, and a variety of other display apparatus. A display apparatus according to an embodiment of the invention only needs to allow the user to visually recognize an image formed by image light along with external light and may, for example, have a configuration in which an optical member that transmits external light allows visual recognition of an image formed by image light. Specifically, in addition to the head mounted display described above having the configuration in which an optical member that transmits external light is provided, the invention is also applicable to a display apparatus that projects image light on a light transmissive flat surface or a curved surface (made, for example, of glass or transparent plastic material) installed in a position separate from the user in an immobile or movable manner. A display apparatus of this type may, for example, be so configured that image light is projected on a window pane of a vehicle and a user in the vehicle and a user outside the vehicle are allowed to visually recognize an image formed by the image light along with scenes inside and outside the vehicle. Another display apparatus of this type may, for example, be so configured that image light is projected on a transparent, semi-transparent, or colored transparent display surface, such as a windowpane of a building, installed in an immobile manner and users around the display surface visually recognize an image formed by the image light along with a scene through the display surface.

At least part of the functional blocks shown in FIGS. 2 and 8 may be achieved by hardware or hardware and software cooperating with each other, and the configuration formed of independent hardware resources shown in FIG. 2 is not necessarily employed.

The action of the control section 140 described in the above first and second embodiments can instead be achieved in the form of a program. That is, the control section 140 may include a CPU, a ROM, and a RAM, and the CPU may execute a program to achieve, for example, the functions of the target detection section 171, the distance detection section 173, the image display control section 176, and the image generation section 177. Further, the CPU in the control section 140 may execute a program to perform the functions of the operating system 150, the image processing section 160, the voice processing section 170, and the display control section 190. Part or the entirety of these programs may be achieved by hardware. For example, each of the processing sections described above provided in the control section 140 may be formed of an ASIC (application specific integrated circuit), a programmed FPGA (field-programmable gate array) or any other programmed PLD (programmable logic device), or a circuit including a plurality of semiconductor devices. When the functions described above are achieved by hardware that executes a program, the program may be stored in the ROM in the control section 140, the storage section 120, or another storage device in the control unit 10. Instead, the control section 140 may acquire a program stored in an external apparatus via the communication section 117 or the interface 180 and execute the program.

Among the configurations formed in the control unit 10, only the operation section 135 may be formed as an independent user interface (UI), and the power supply 130 in the embodiments described above may be independently formed in an exchangeable manner. Further, the configurations formed in the control unit 10 may be redundantly formed in the image display unit 20. For example, the control section 140 shown in FIG. 2 may be formed both in the control unit 10 and the image display unit 20, and the control section 140 formed in the control unit 10 and the CPU formed in the image display unit 20 may perform different functions.

The entire disclosure of Japanese Patent Application Nos. 2014-156697, filed Jul. 31, 2014 and 2015-039766, filed Mar. 2, 2015 are expressly incorporated by reference herein.

What is claimed is:

1. A head-mountable display apparatus that is configured to be able to be worn on a head of a user, the head-mountable display apparatus comprising:
   a display that displays an image in a visually recognizable manner superimposed on outside real world scenery;
   a camera that performs image capturing along directions of sight lines of the user; and
   a processor programmed to:
   cause the camera to capture an image;
   detect, in the captured image, a target object;
   detect a distance between the detected target object and the head-mounted display apparatus;
   generate a display image from the captured image by cutting out, from the captured image, an area containing the detected target object, and enlarging, based on the detected distance, the cut out area containing the detected target object, wherein the generated display image is an enlarged version of the area containing the detected target object cut out of the captured image; and
   control the display to display the generated display image superimposed on the outside real world scenery, wherein the display image and the outside real world scenery are live view.

2. The head-mountable display apparatus according to claim 1, wherein the processor is further programmed to:
   detect a state in which the head-mountable display apparatus is used, and
   adjust a form of the display image in accordance with the detected state.

3. The head-mountable display apparatus according to claim 1, wherein the processor is further programmed to:
   detect a position of the head-mountable display apparatus, and
   adjust a form of the display image in accordance with the detected position.

4. The head-mountable display apparatus according to claim 3, wherein the processor is further programmed to:
   adjust at least one of a display position of the display image and a display size of the display image in such a way that the display image is displayed on the display separate from the center of the directions of the sight lines of the user in correspondence with the detected position.

5. The head-mountable display apparatus according to claim 1, wherein the processor is further programmed to:
   detect an action of the user based on captured image data from the camera, and
   adjust a form of the display image in accordance with the detected action of the user.

6. The head-mountable display apparatus according to claim 1, wherein the processor is further programmed to:
   detect a voice, and
   adjust a form of the display image in accordance with the detected voice.

7. The head-mountable display apparatus according to claim 1, wherein the processor is further programmed to:
   detect an action of the user based on captured image data from the camera, and
   generate the display image by extracting, from the captured image, an area identified based on the detected action of the user and processing the extracted area.

8. The head-mountable display apparatus according to claim 1, wherein the processor is further programmed to: generate the display image by cutting out an area that satisfies a preset condition in the captured image.

9. The head-mountable display apparatus according to claim 1, wherein the processor is further programmed to:
   identify directions corresponding to the directions of the sight lines of the user; and
   detect, in the captured image, a target object present in the directions of the sight lines of the user, as the detected target object.

10. The head-mountable display apparatus according to claim 9, wherein the processor is further programmed to: detect the directions of the sight lines of the user and detect the target object present in the detected directions of the sight lines of the user.

11. The head-mountable display apparatus according to claim 10, wherein the processor is further programmed to: detect a direction of a sight line of an eye corresponding to a dominant eye of the user.

12. The head-mountable display apparatus according to claim 7, wherein the processor is further programmed to: when the detected action of the user is a predetermined action, identify the directions corresponding to the directions of the sight lines of the user based on the predetermined action.

13. The head-mountable display apparatus according to claim 7, wherein the processor is further programmed to: when the detected action is an action of at least one of limbs of the user, identify the directions corresponding to the directions of the sight lines of the user based on the detected action.

14. The head-mountable display apparatus according to claim 9, wherein the processor is further programmed to:
   store, in a memory, an amount of feature of the target object, and
   detect the target object by detecting an image that conforms to the amount of feature of the target object stored in the memory from the captured image.

15. The head-mountable display apparatus according to claim 9, wherein the processor is further programmed to:

generate the display image by enlarging the area containing the detected target object in accordance with an enlargement factor associated with the detected distance.

16. The head-mountable display apparatus according to claim 1, wherein the processor is further programmed to: generate the display image by acquiring a plurality of images captured by the camera at different points of time and specifying an area that satisfies a preset condition in the plurality of captured images.

17. A method for controlling a head-mountable display apparatus that is configured to be able to be worn on a head of a user, the method comprising:
performing image capturing, by a camera of the head-mountable display apparatus, along directions of sight lines of a user;
detecting, by a processor of the head-mounted display apparatus, a target object in a captured image;
detecting, by the processor, a distance between the detected target object and the head-mounted display apparatus;
generating, by the processor, a display image from the captured image by cutting out an area, from the captured image, containing the detected target object, and enlarging, based on the detected distance, the cut out area containing the detected target object, wherein the generated display image is an enlarged version of the area containing the detected target object cut out of the captured image; and
controlling, by the processor, the display to display the generated display image superimposed on outside real world scenery, wherein the display image and the outside real world scenery are live view.

18. A non-transitory computer readable medium that stores a computer-executable program that, when executed by a head-mounted display device, causes the head-mounted display device to:
cause a camera of the head-mountable display apparatus to capture an image along directions of sight lines of a user;
detect, in the captured image, a target object;
detect a distance between the detected target object and the head-mounted display apparatus;
generate a display image from the captured image by cutting out, from the captured image, an area containing the detected target object, and enlarging, based on the detected distance, the cut out area containing the detected target object, wherein the generated display image is an enlarged version of the area containing the detected target object cut out of the captured image; and
control a display of the head-mountable display apparatus to display the generated display image superimposed on outside real world scenery, wherein the display image and the outside real world scenery are live view.

19. The head-mountable display apparatus according to claim 1, wherein the detected target object is a target object that satisfies a predetermined condition under which the processor cuts out the area containing the detected target object.

20. The head-mountable display apparatus according to claim 1, wherein the processor is further programmed to:
determine a size of the area cut out from the captured image based on a display size, which is a resolution or number of image dots, in accordance with which the display image is displayed in displayable areas of the display and an associated enlargement factor; and
perform the enlargement step by converting the size of the area cut out from the captured image in accordance with the display size.

21. The head-mountable display apparatus according to claim 1, further comprising a memory, wherein the memory is configured to store:
enlargement factor setting data, which relates distances to detected target objects to enlargement factors.

22. The head-mountable display apparatus according to claim 1, wherein the processor is further configured to: not allow generation or display of the display image when the distance to the detected target object is shorter than a preset distance.

23. The head-mountable display apparatus according to claim 1, wherein the processor is further programmed to:
detect a direction of a sight line of the user; and
detect the target object present in the detected direction of the sight line of the user.

24. The head-mountable display apparatus according to claim 1, wherein the processor is further programmed to: detect a direction of a sight line of the user based on a detected sight line of an eye corresponding to a dominant eye of eyes of the user.

* * * * *